Figure 1:
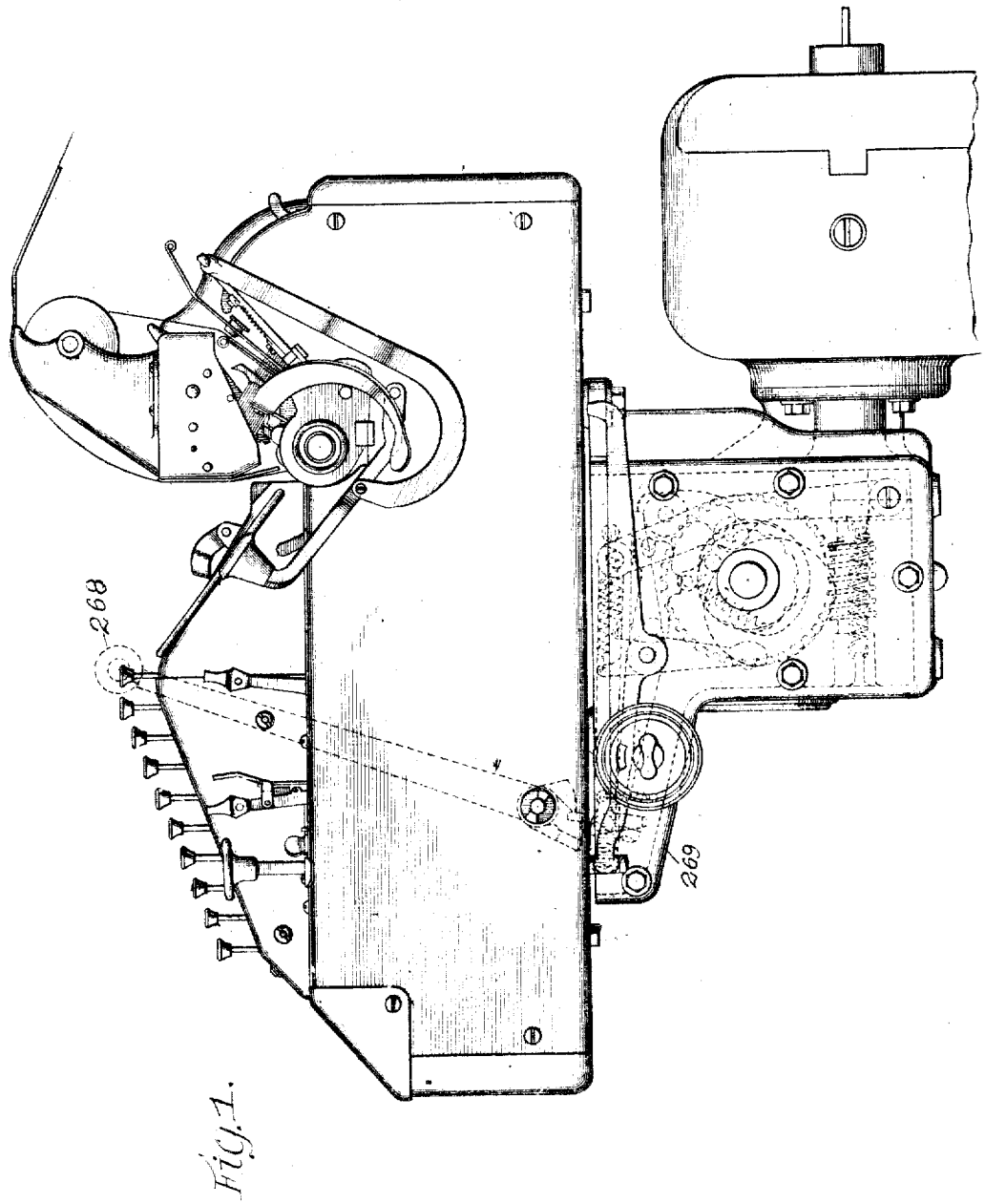

F. A. NIEMANN.
ADDING MACHINE.
APPLICATION FILED OCT. 7, 1912.

1,309,692.

Patented July 15, 1919.
32 SHEETS SHEET 3.

Witnesses:

Inventor:
Frederick A. Niemann
By Munday, Evarts, Adcock & Clarke
Attys.

F. A. NIEMANN.
ADDING MACHINE.
APPLICATION FILED OCT. 7, 1912.

1,309,692.

Patented July 15, 1919.
32 SHEETS—SHEET 7.

Witnesses:

Inventor:
Frederick A. Niemann
By Munday, Evarts, Adcock & Clarke
Attys:

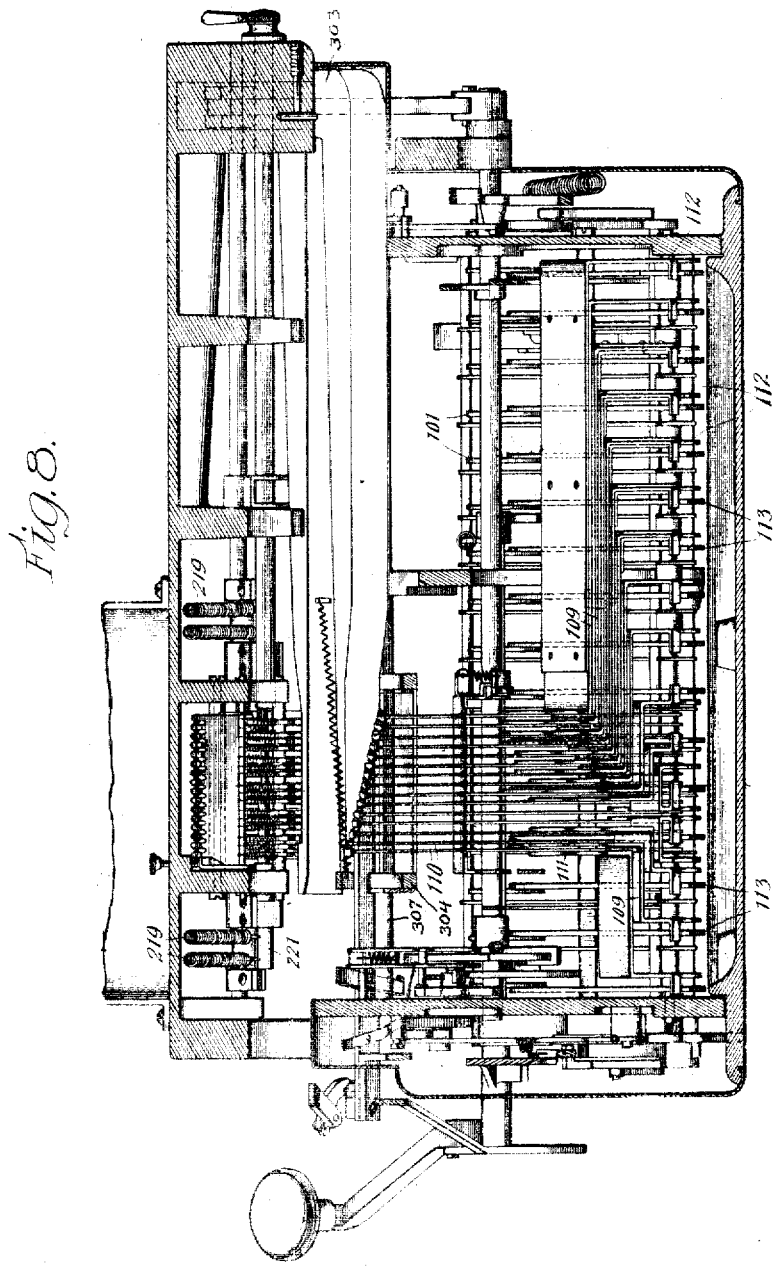

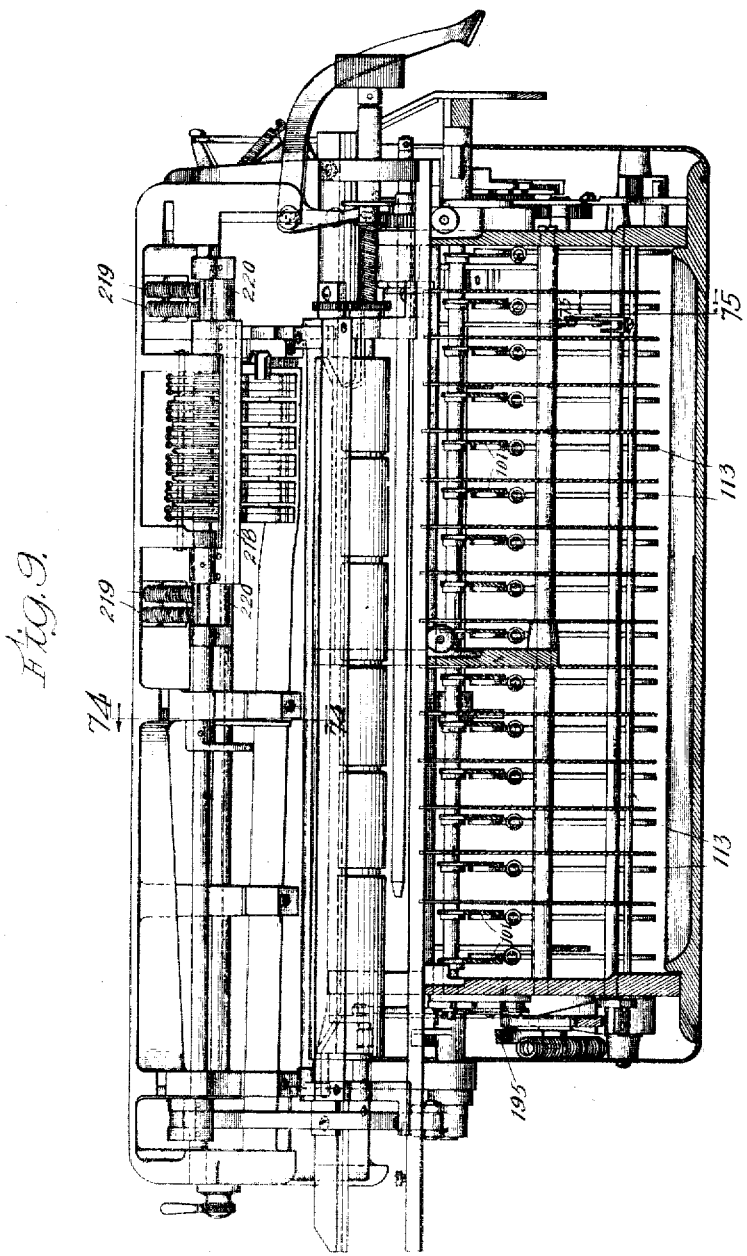

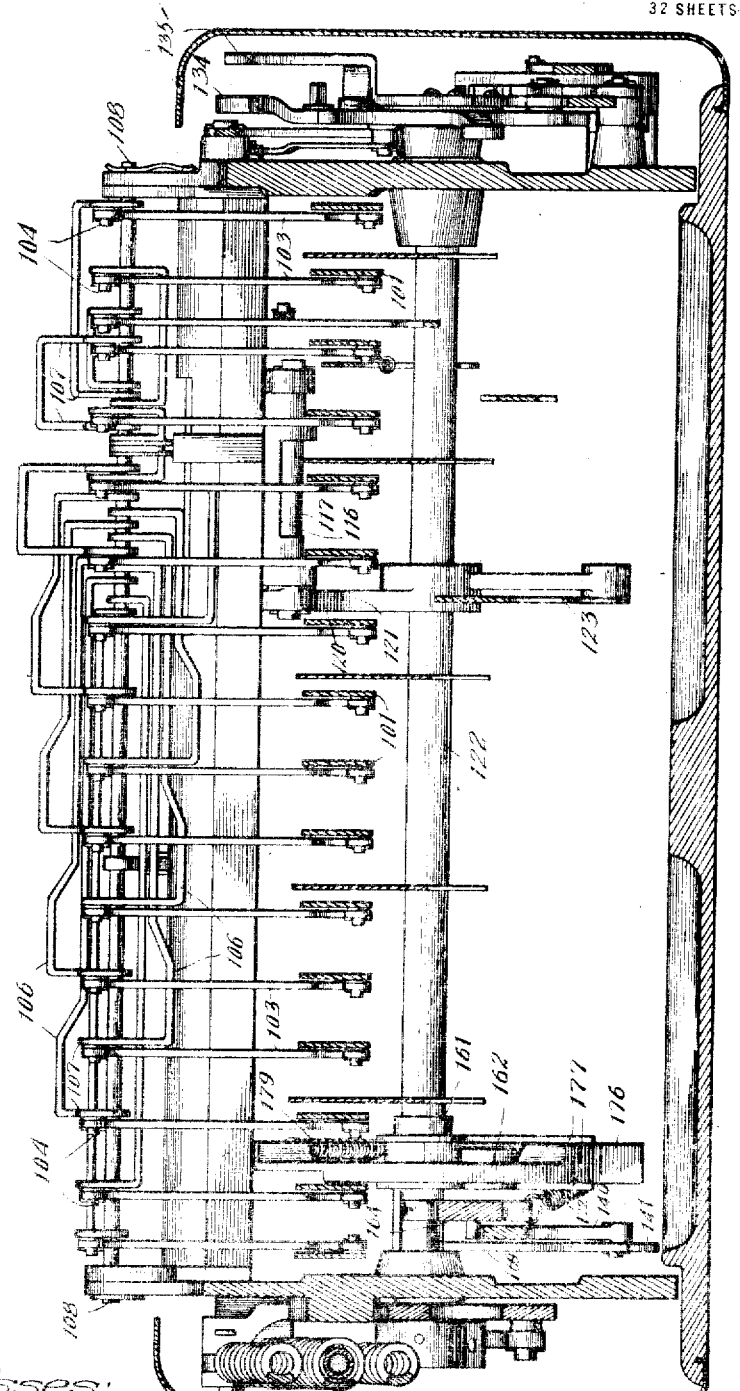

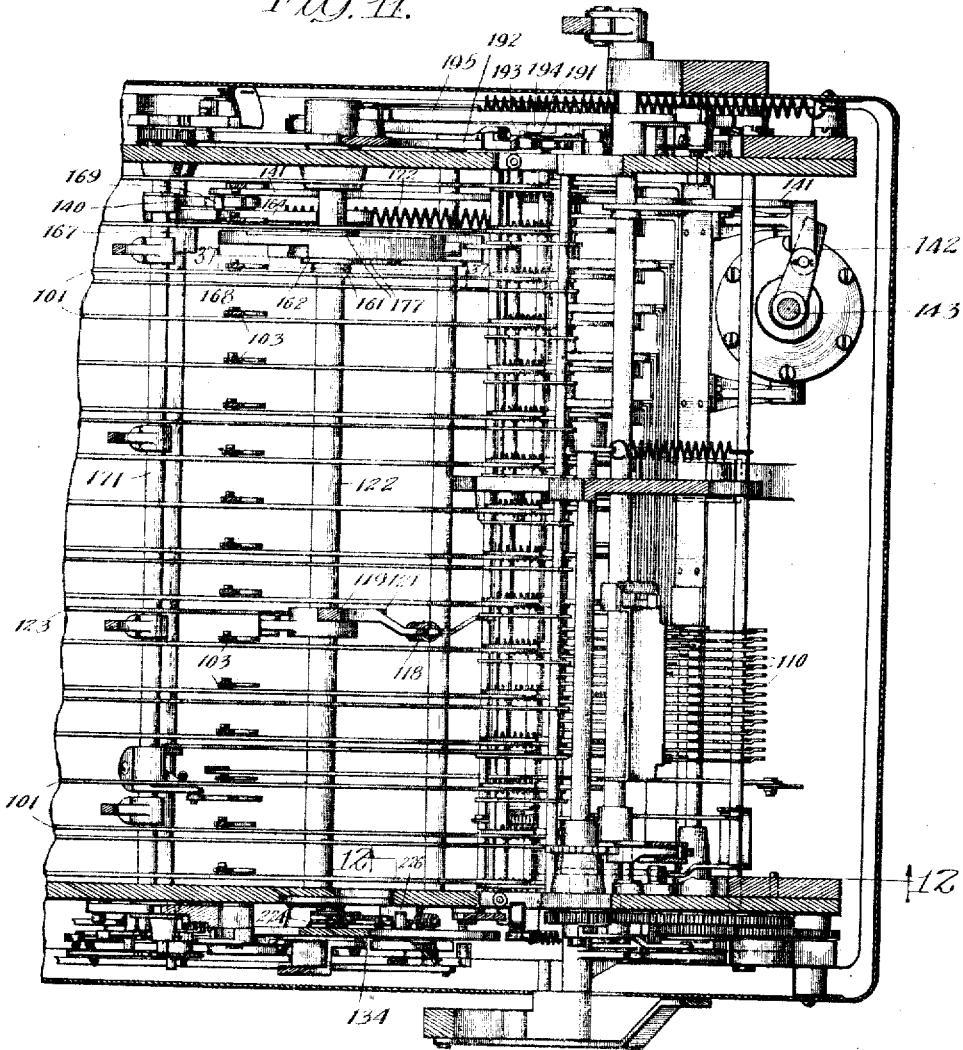

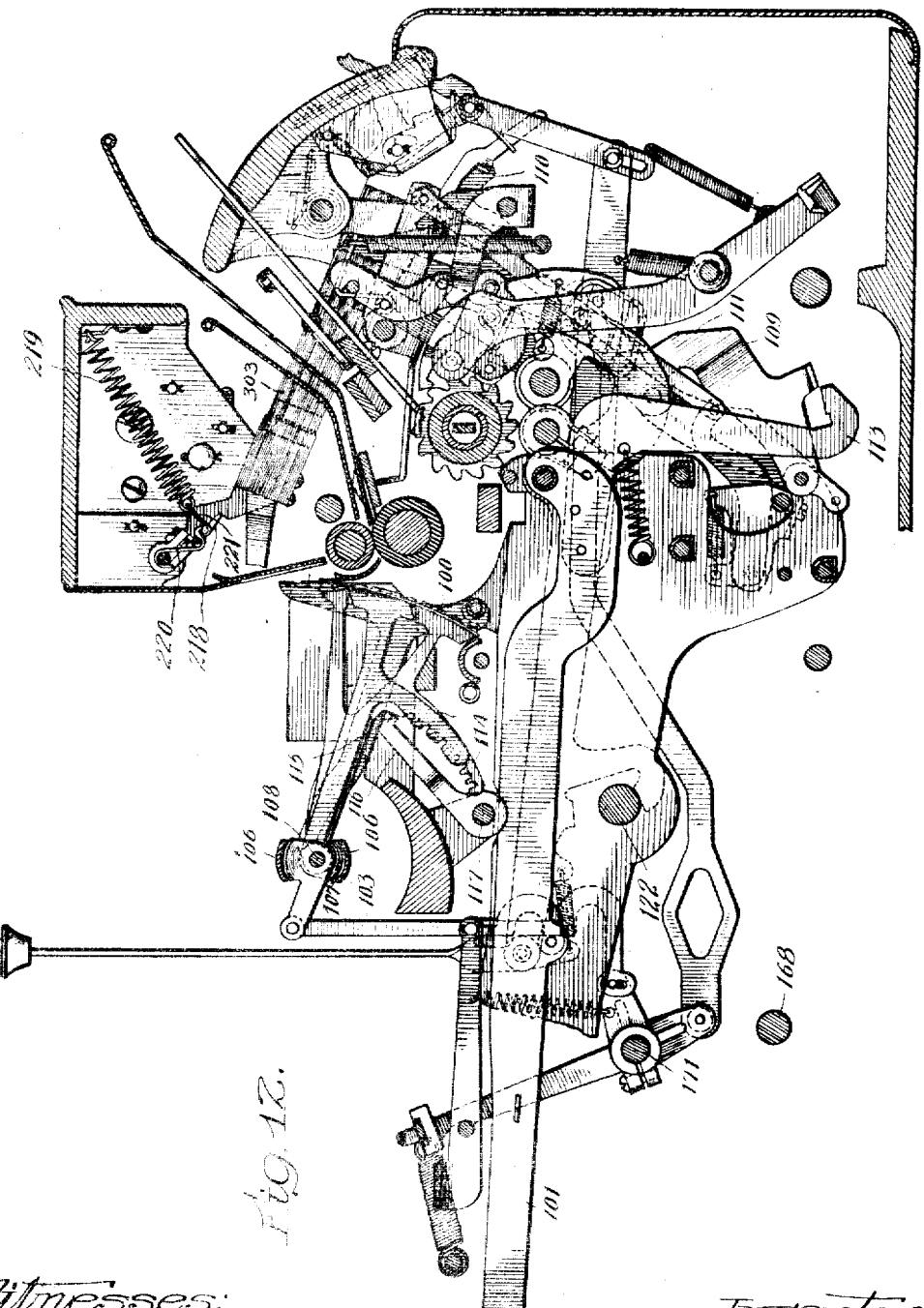

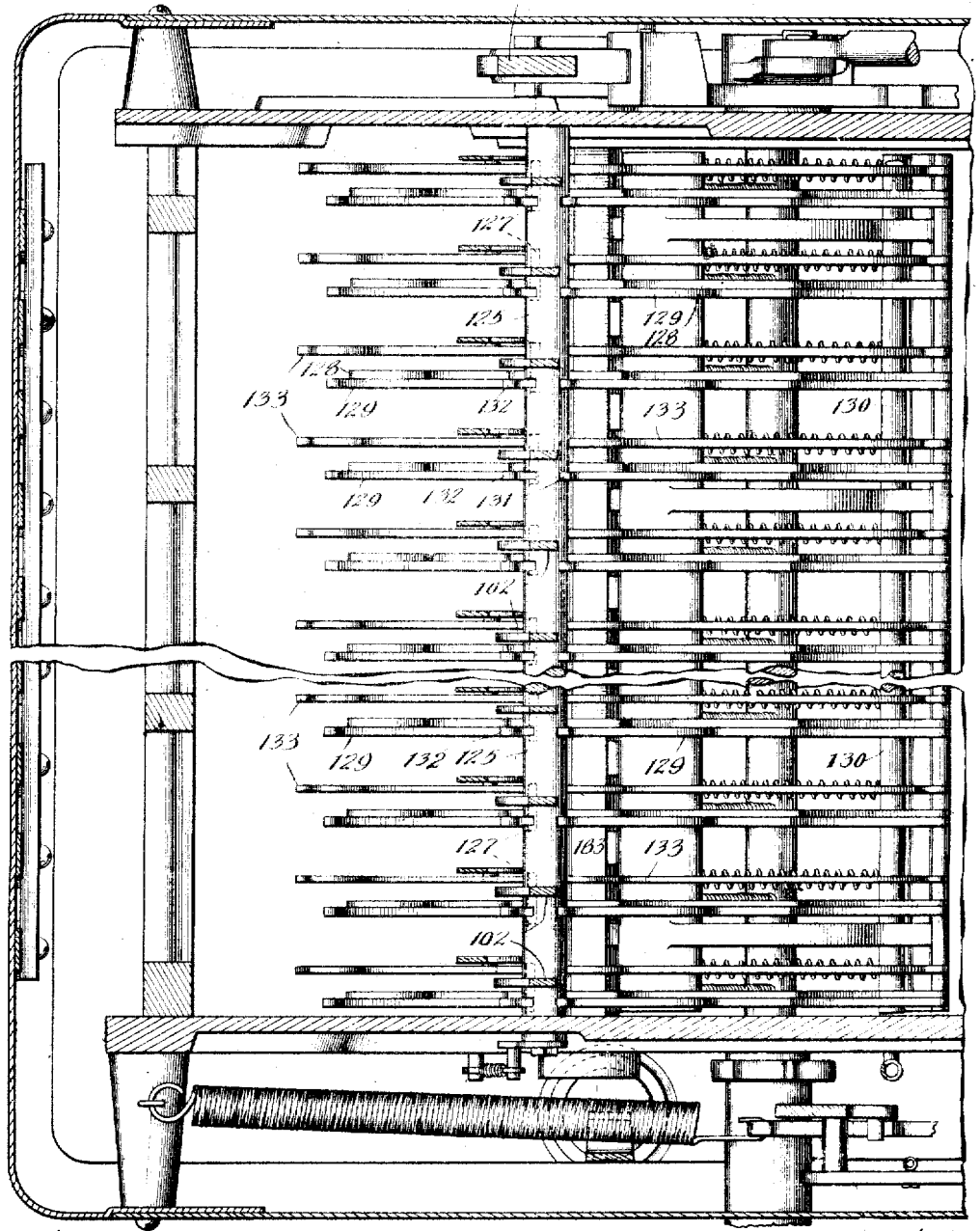

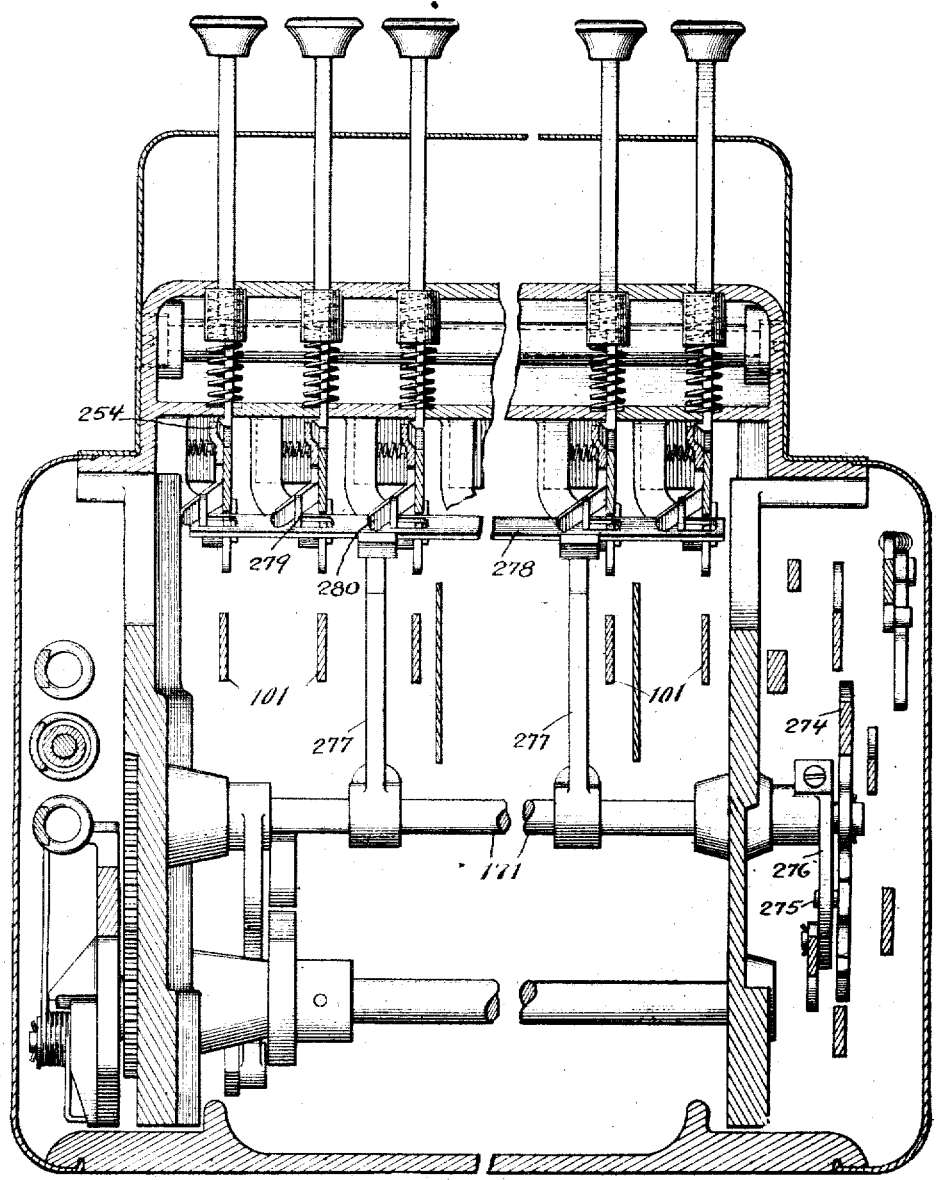

F. A. NIEMANN.
ADDING MACHINE.
APPLICATION FILED OCT. 7, 1912.
1,309,692.
Patented July 15, 1919.
32 SHEETS—SHEET 15.
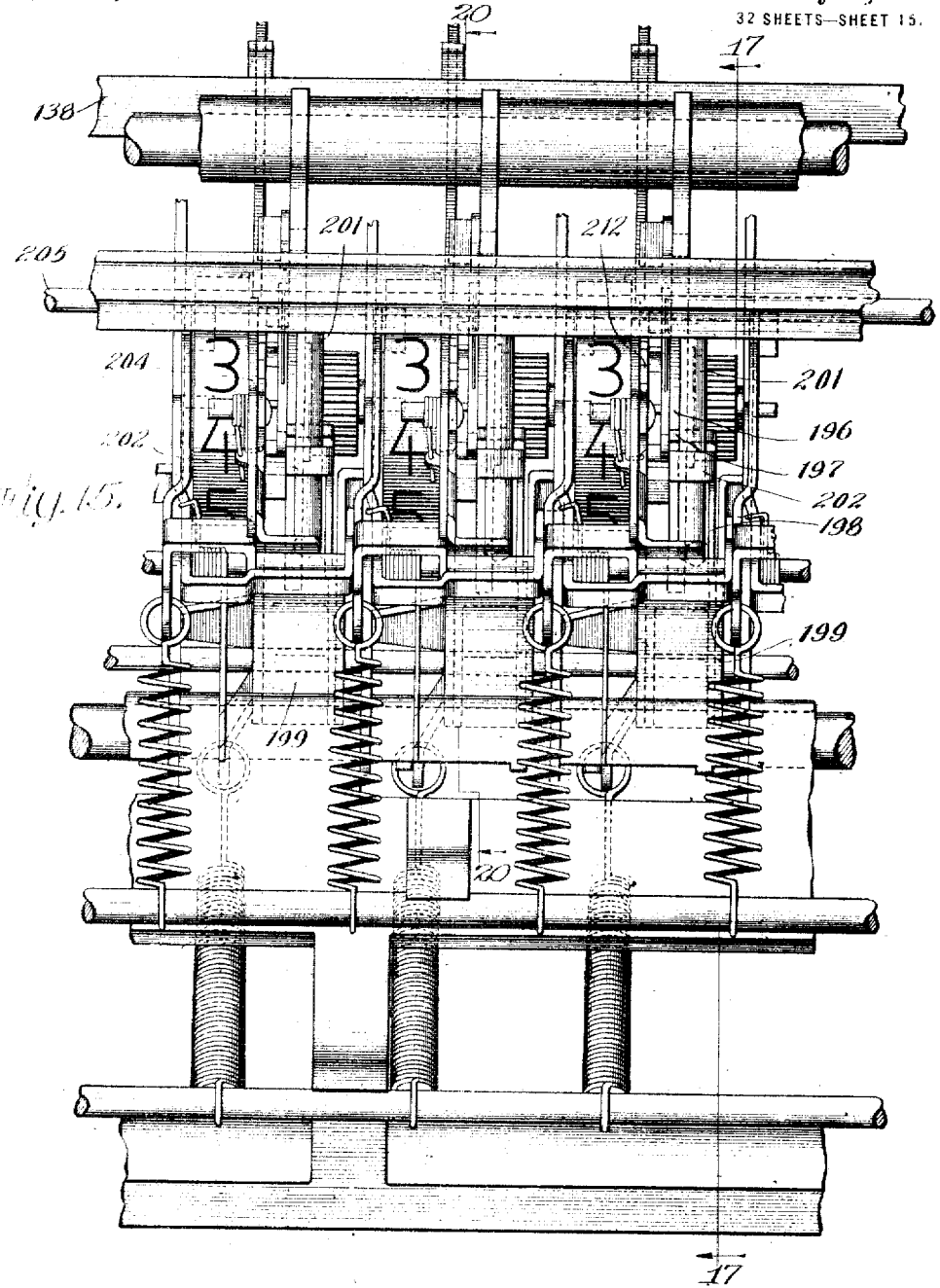
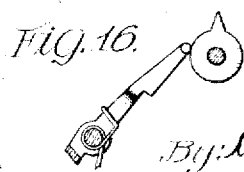
Fig. 16.
Witnesses:
Inventor:
Frederick A. Niemann
By Munday, Evarts, Adcock & Clarke
Attys

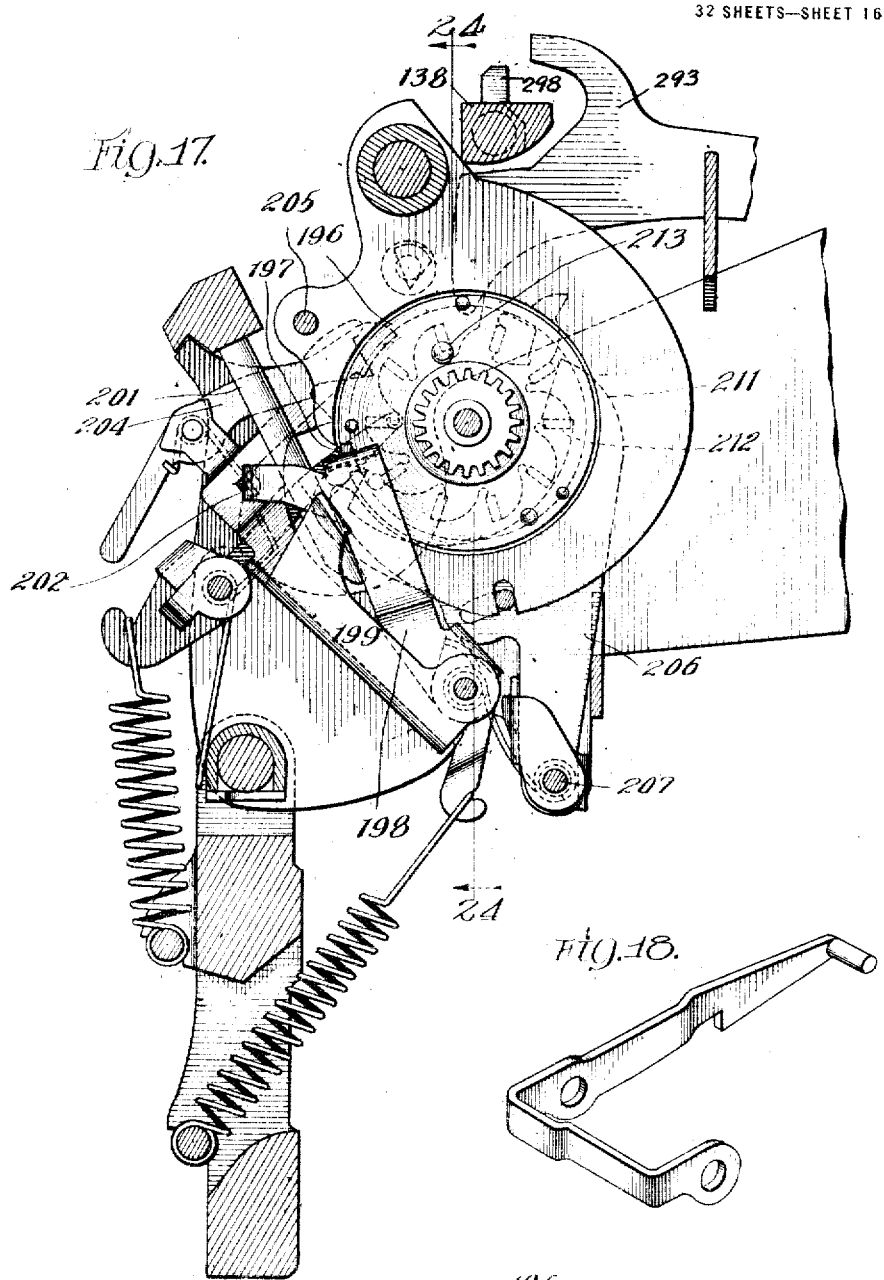

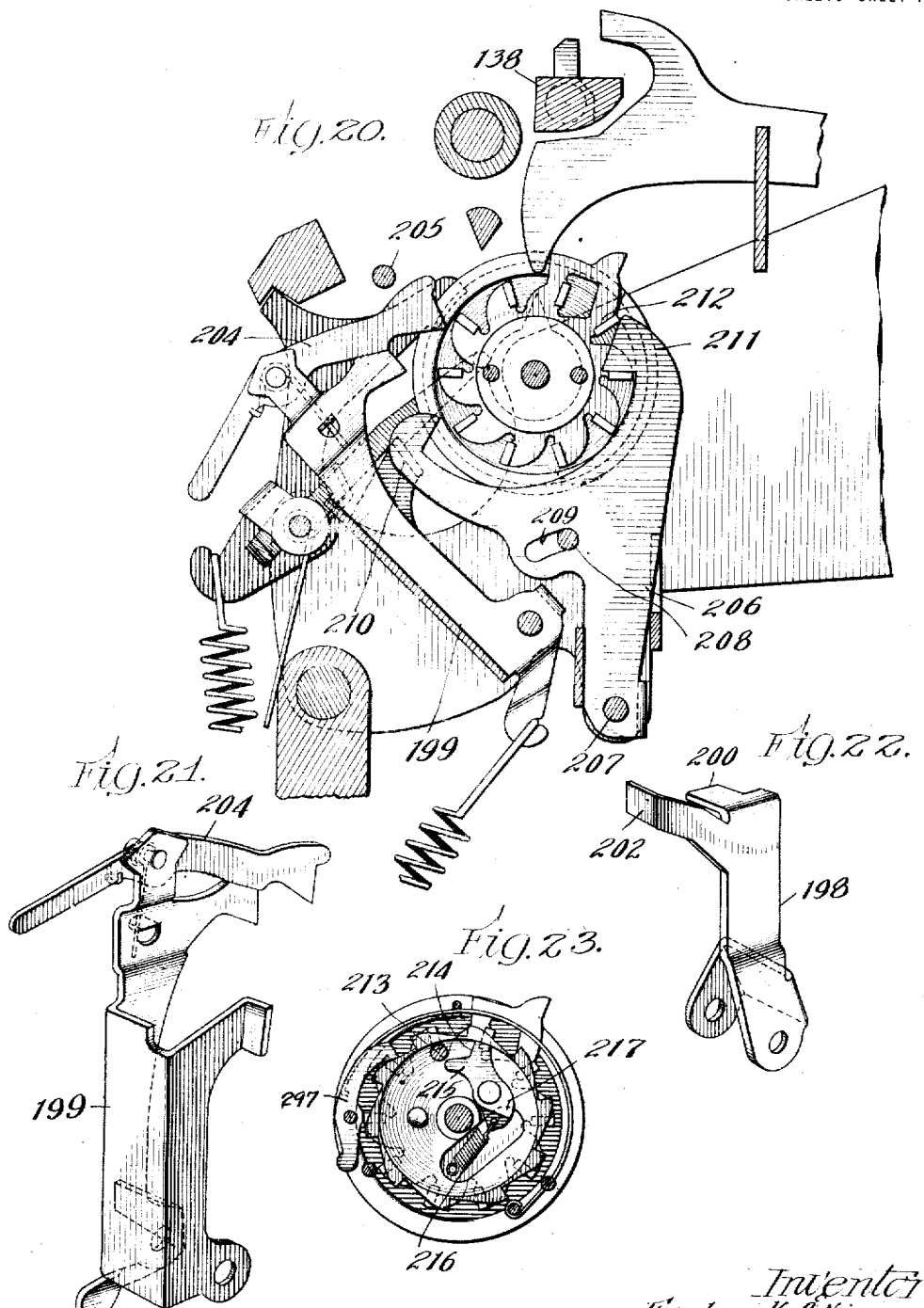

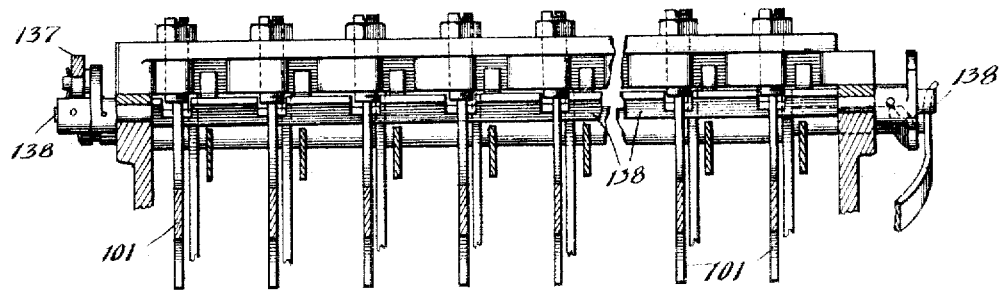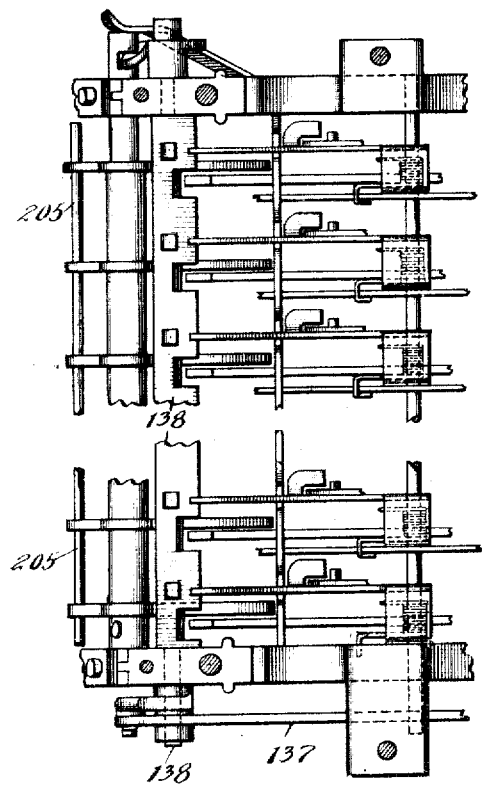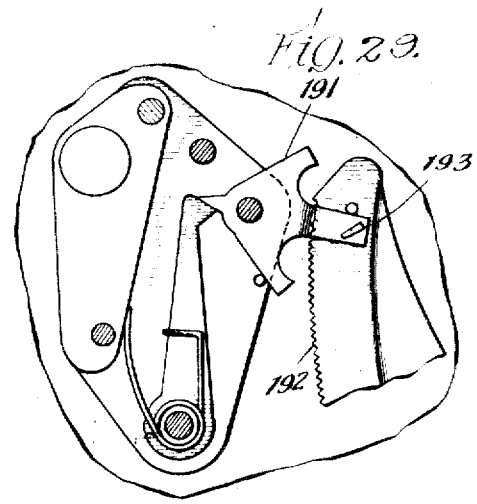

F. A. NIEMANN.
ADDING MACHINE.
APPLICATION FILED OCT. 7, 1912.
1,309,692.
Patented July 15, 1919.
32 SHEETS—SHEET 20.
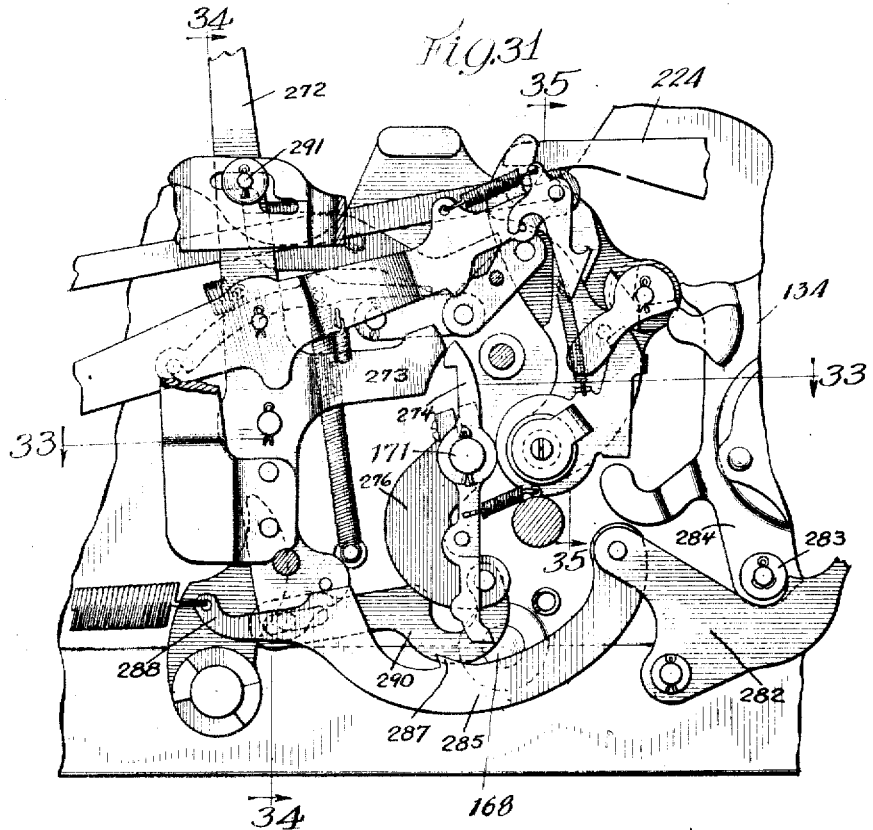
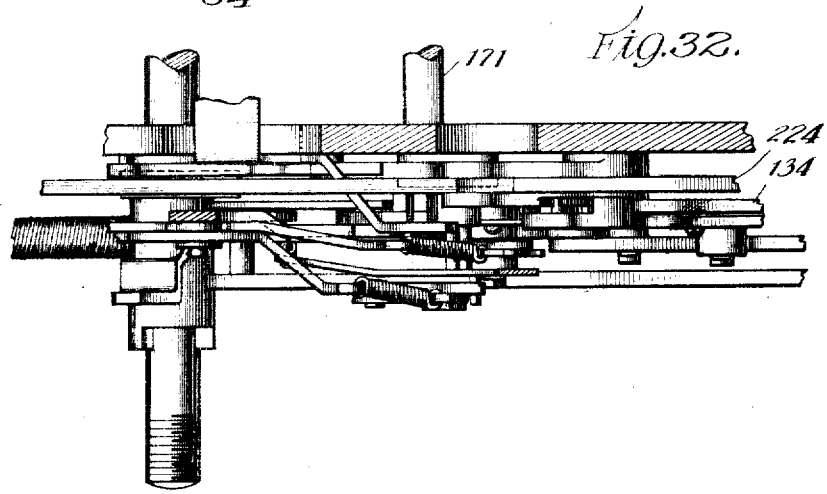

F. A. NIEMANN.
ADDING MACHINE.
APPLICATION FILED OCT. 7, 1912.
1,309,692.
Patented July 15, 1919.
32 SHEETS—SHEET 21.
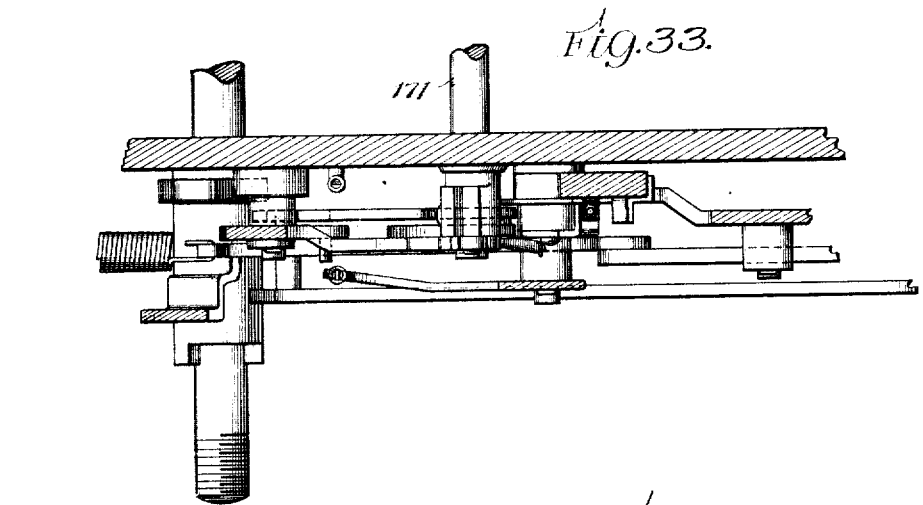
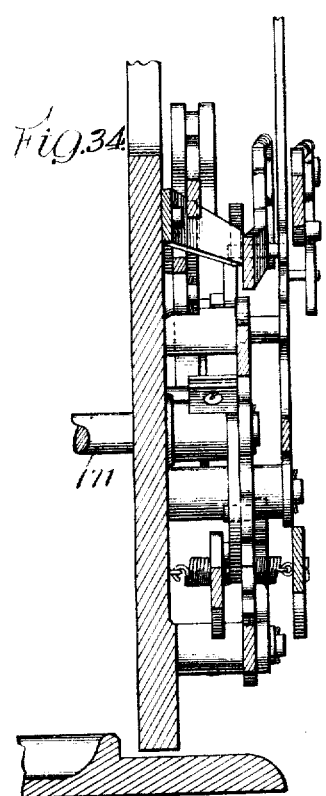
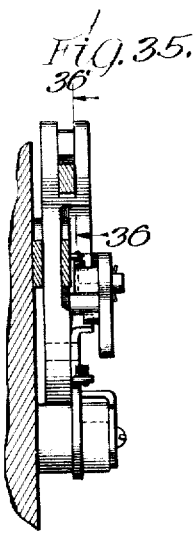
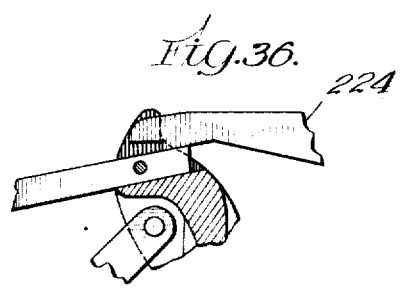

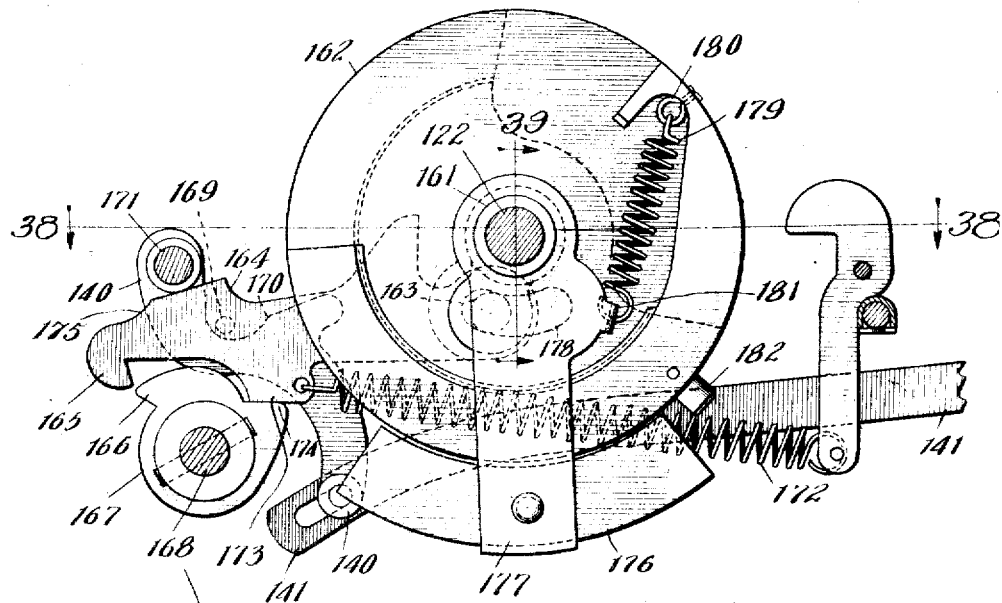
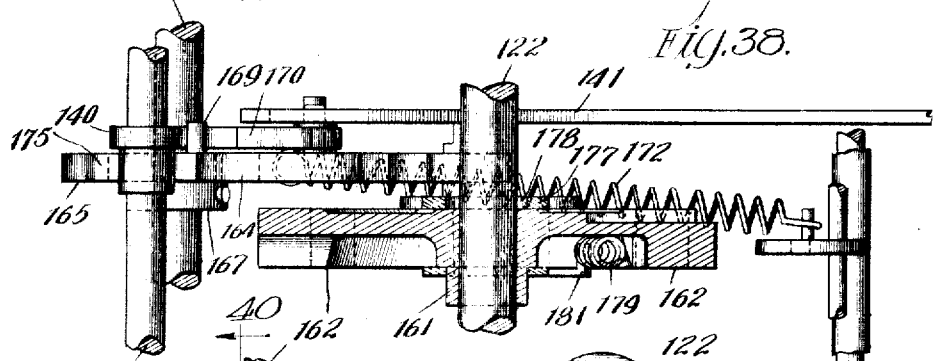
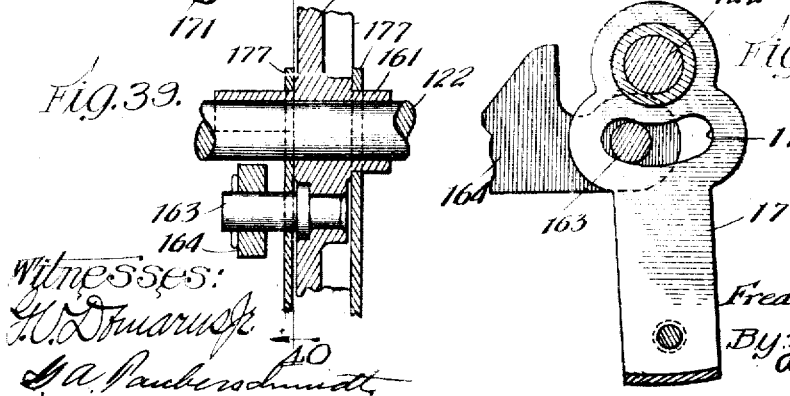

F. A. NIEMANN.
ADDING MACHINE.
APPLICATION FILED OCT. 7, 1912.
1,309,692.
Patented July 15, 1919.
32 SHEETS—SHEET 23.
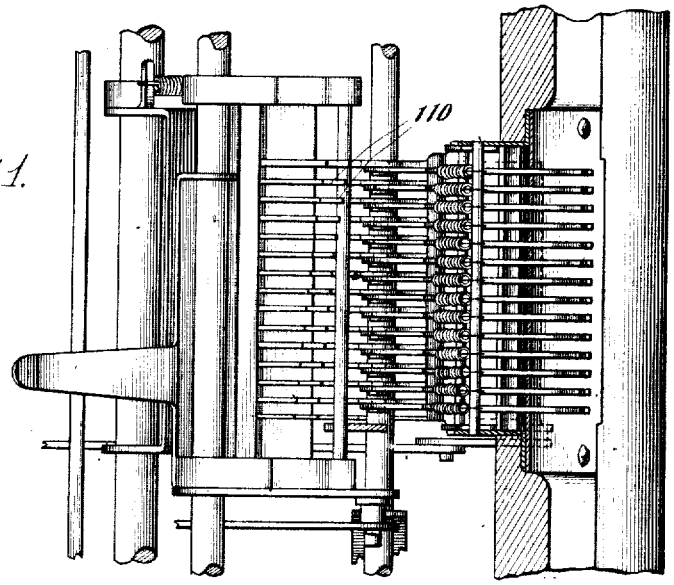
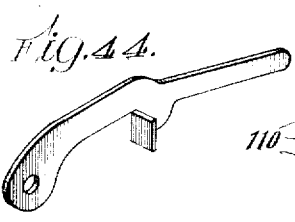
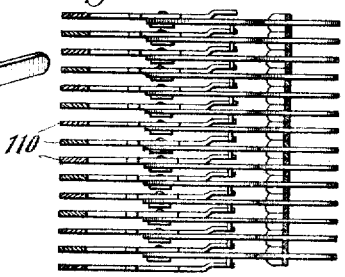
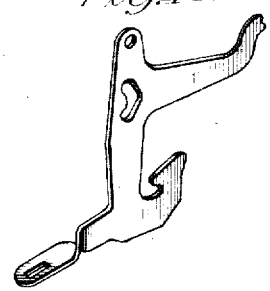
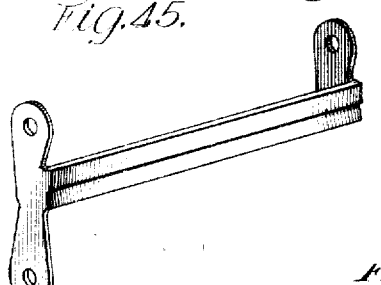

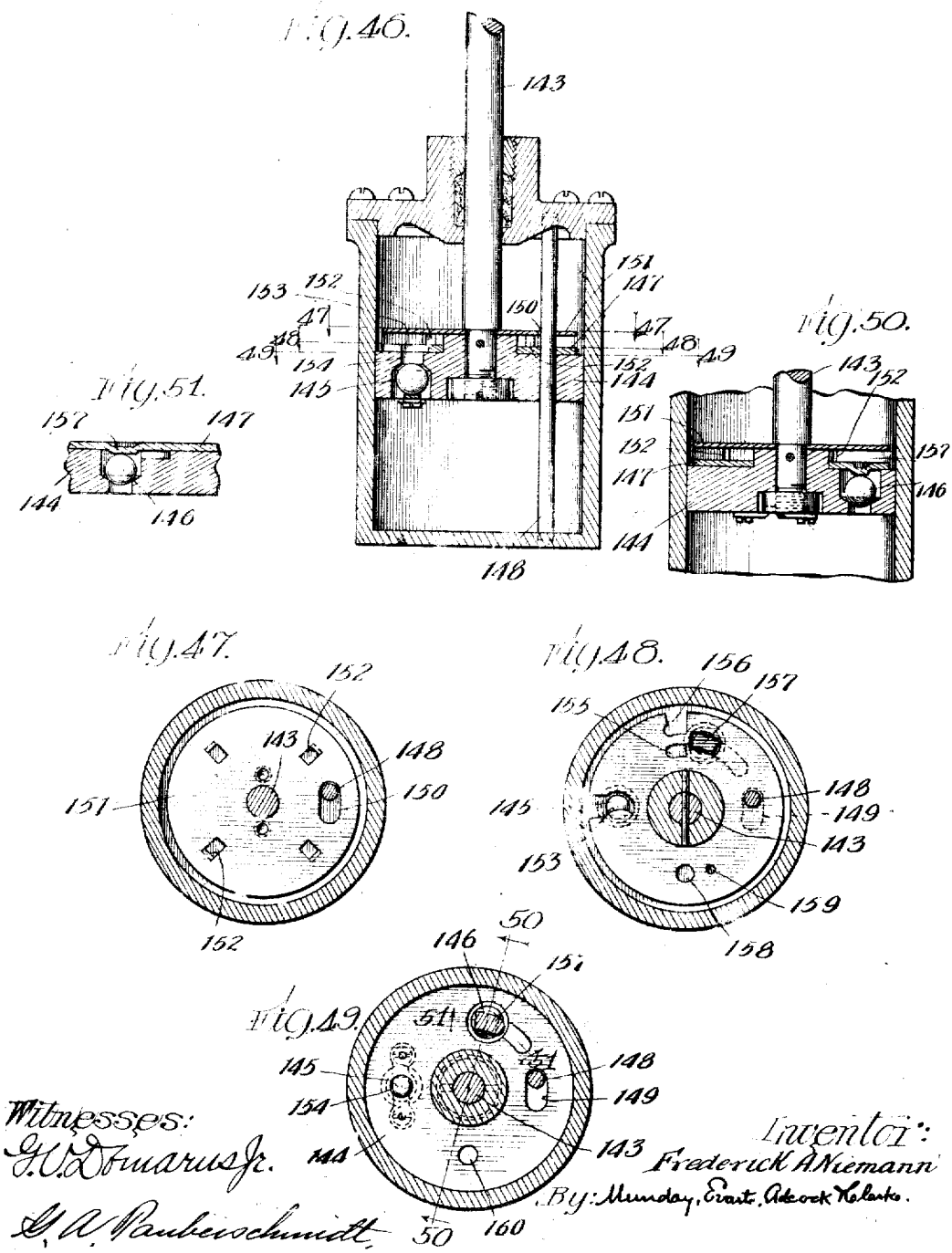

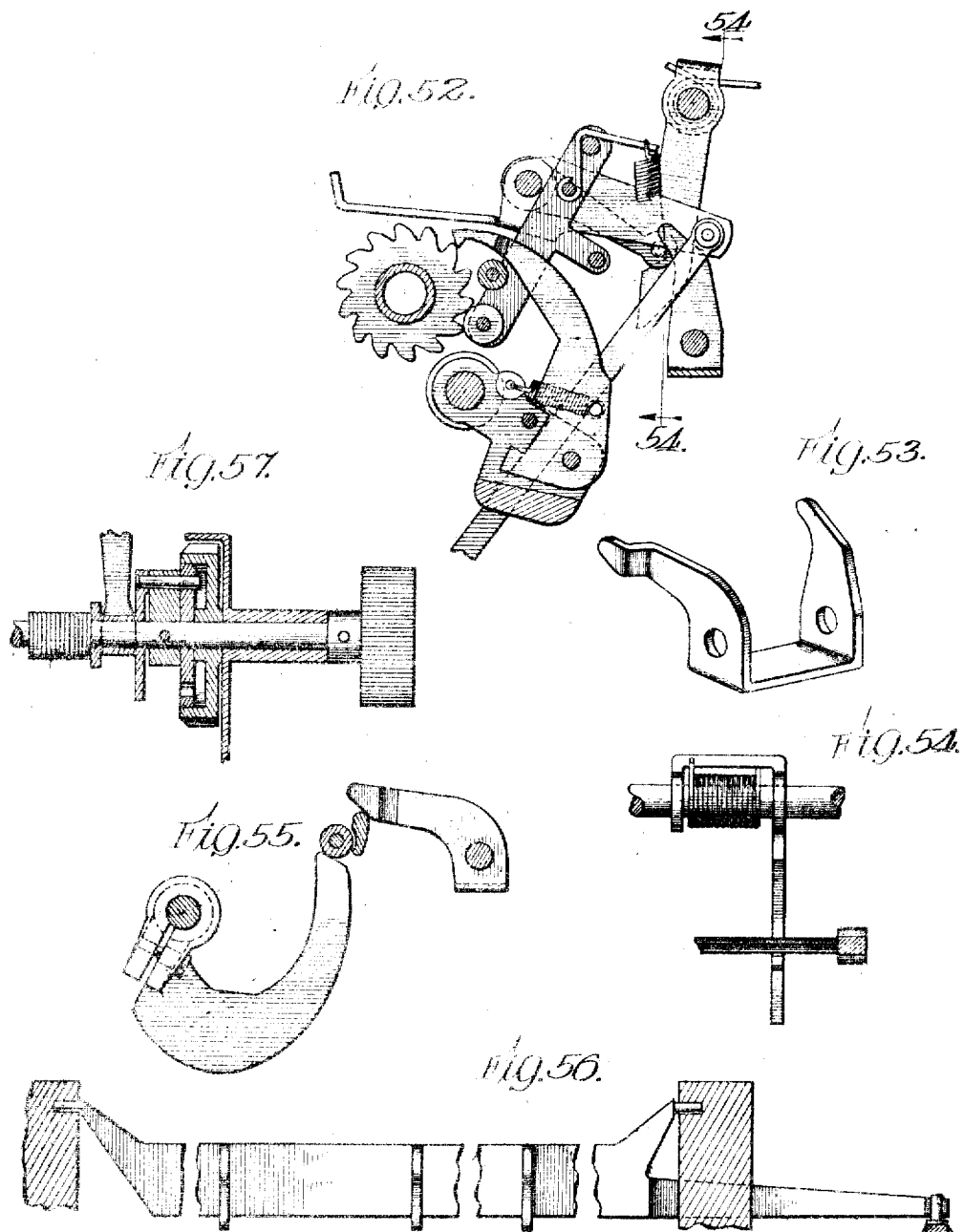

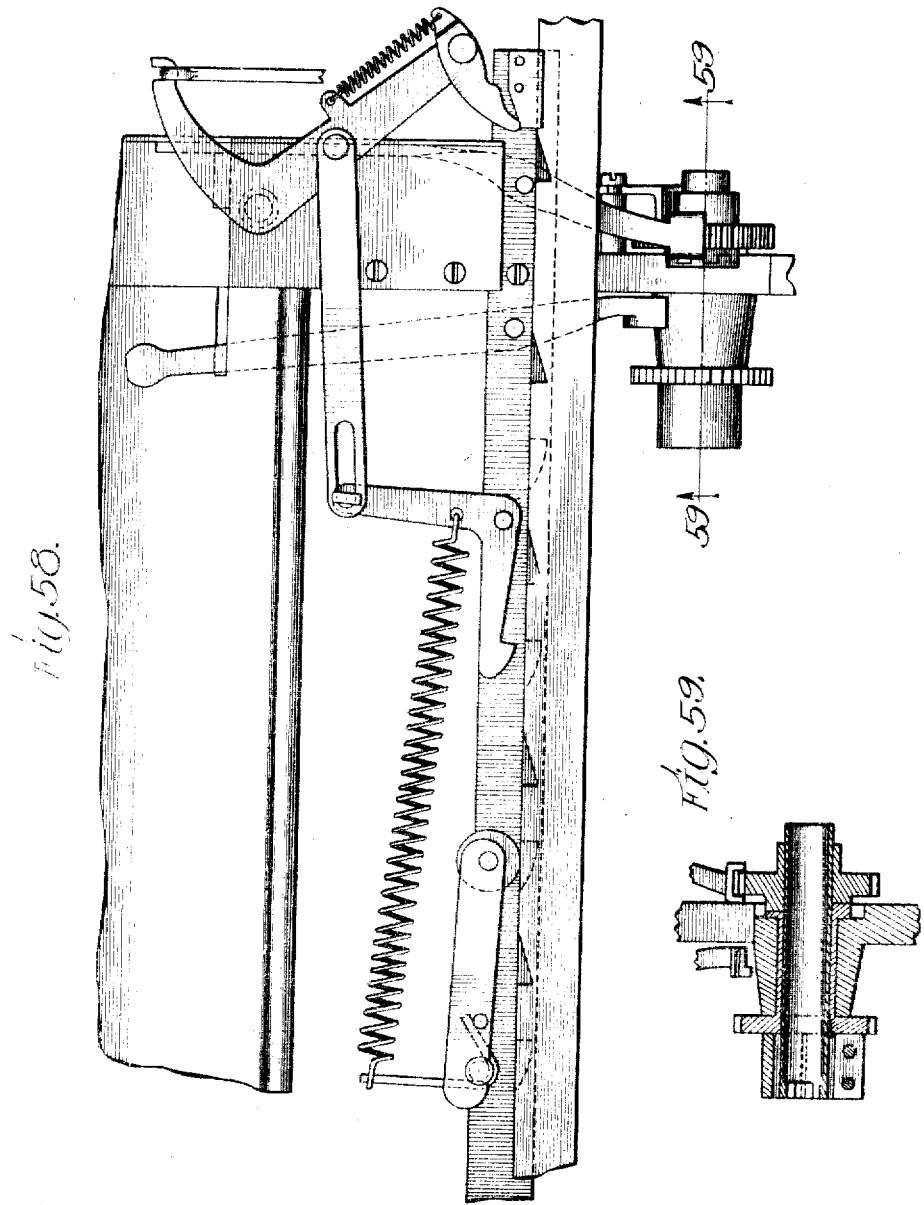

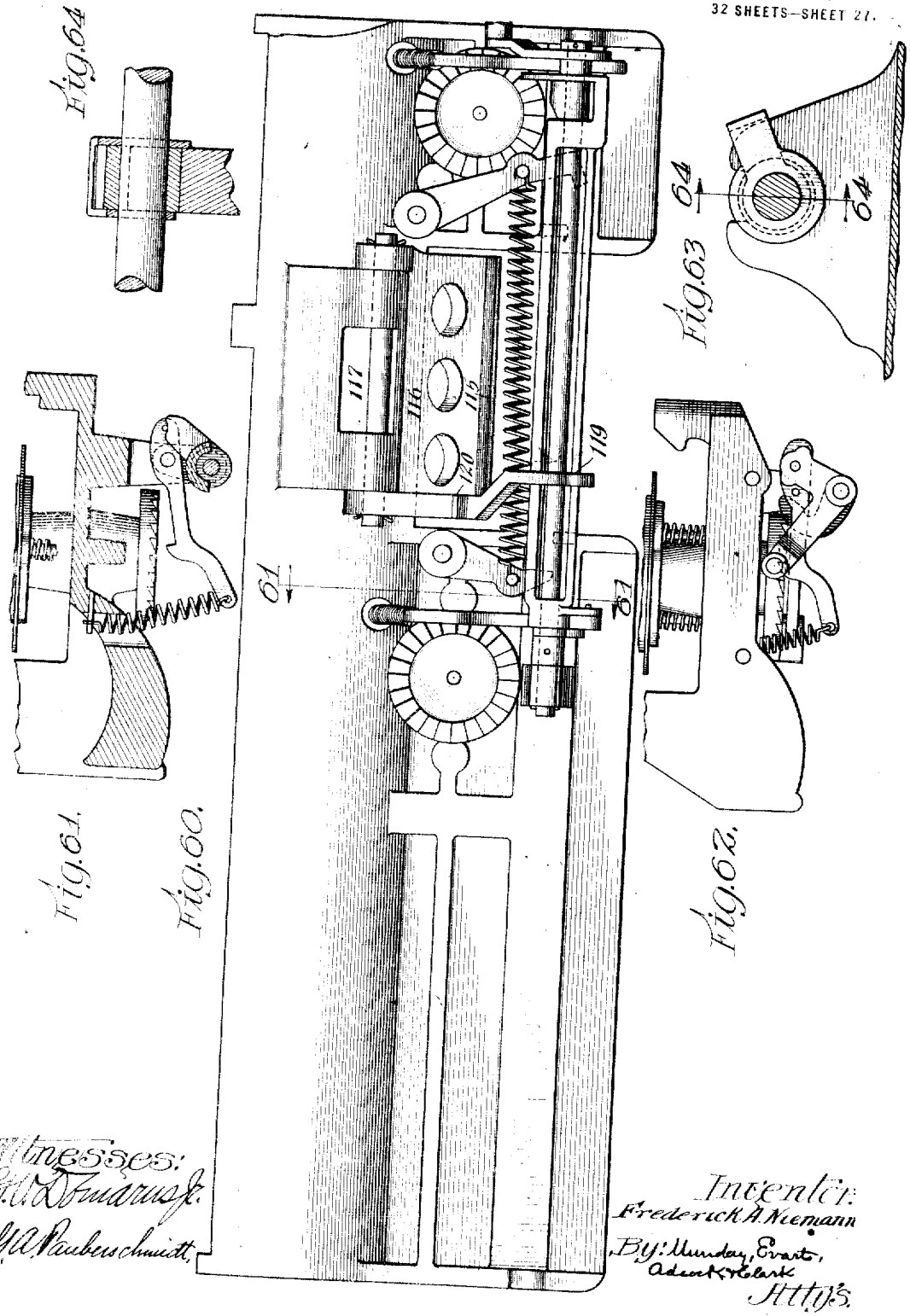

F. A. NIEMANN.
ADDING MACHINE.
APPLICATION FILED OCT. 7, 1912.
1,309,692.
Patented July 15, 1919.
32 SHEETS—SHEET 28.
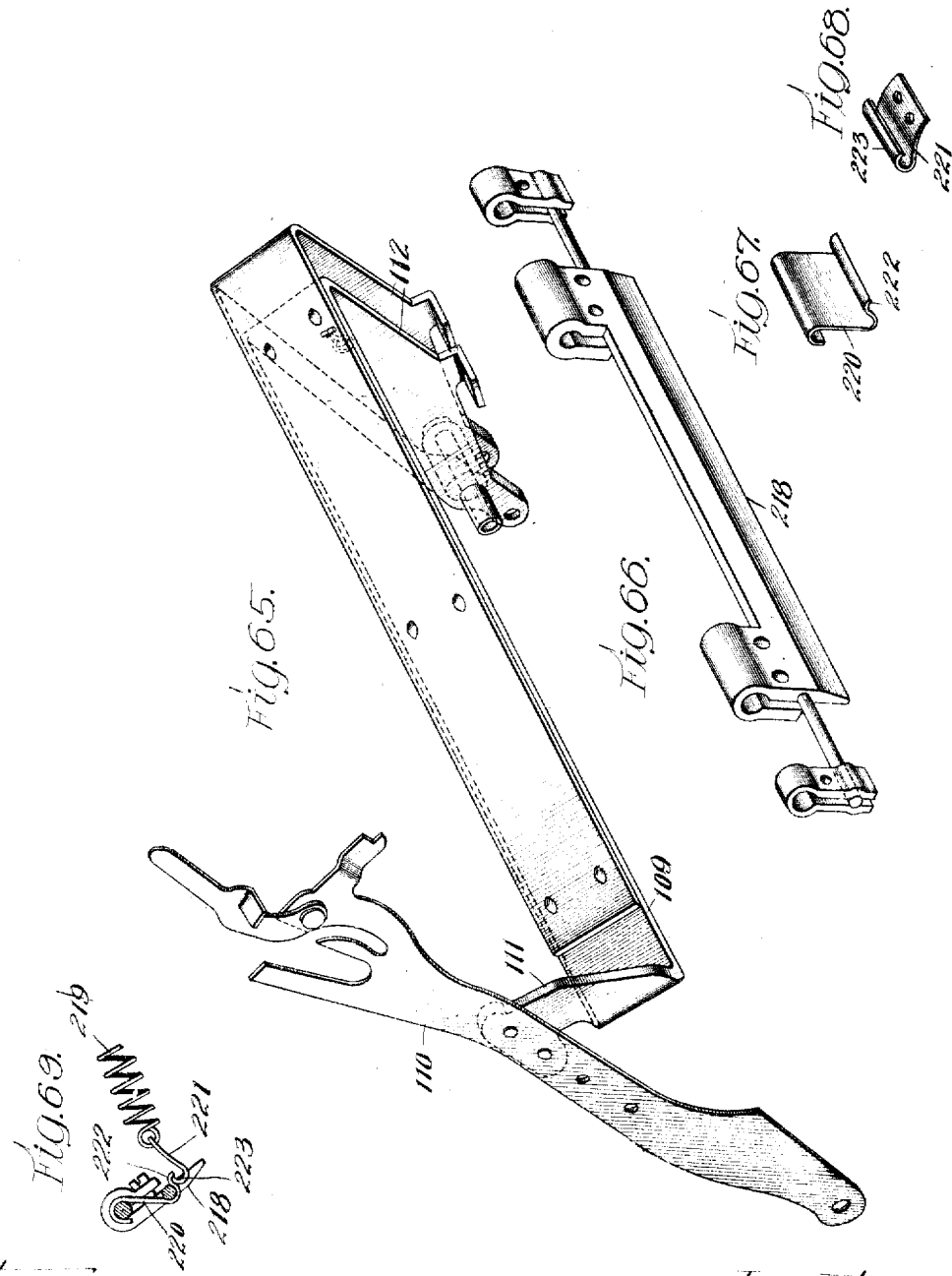

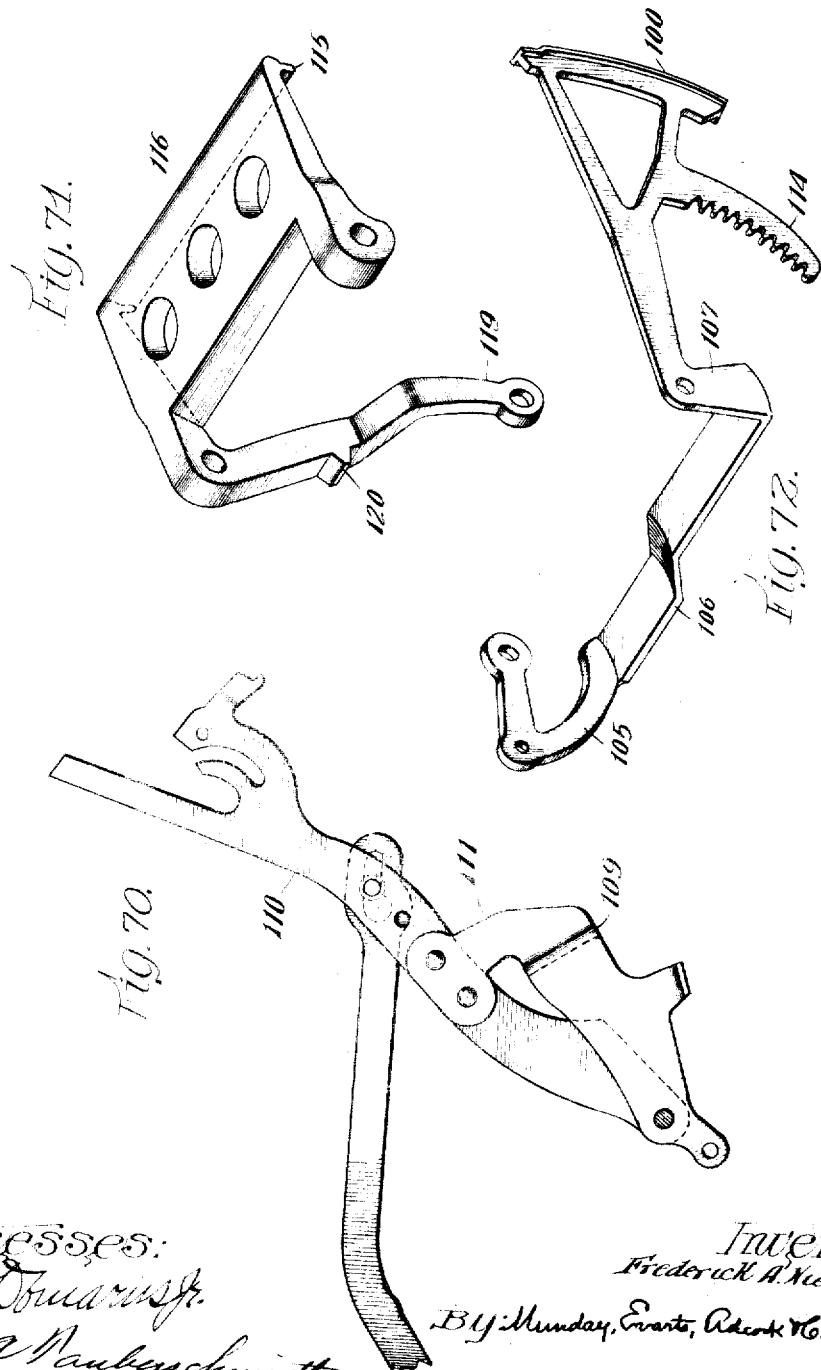

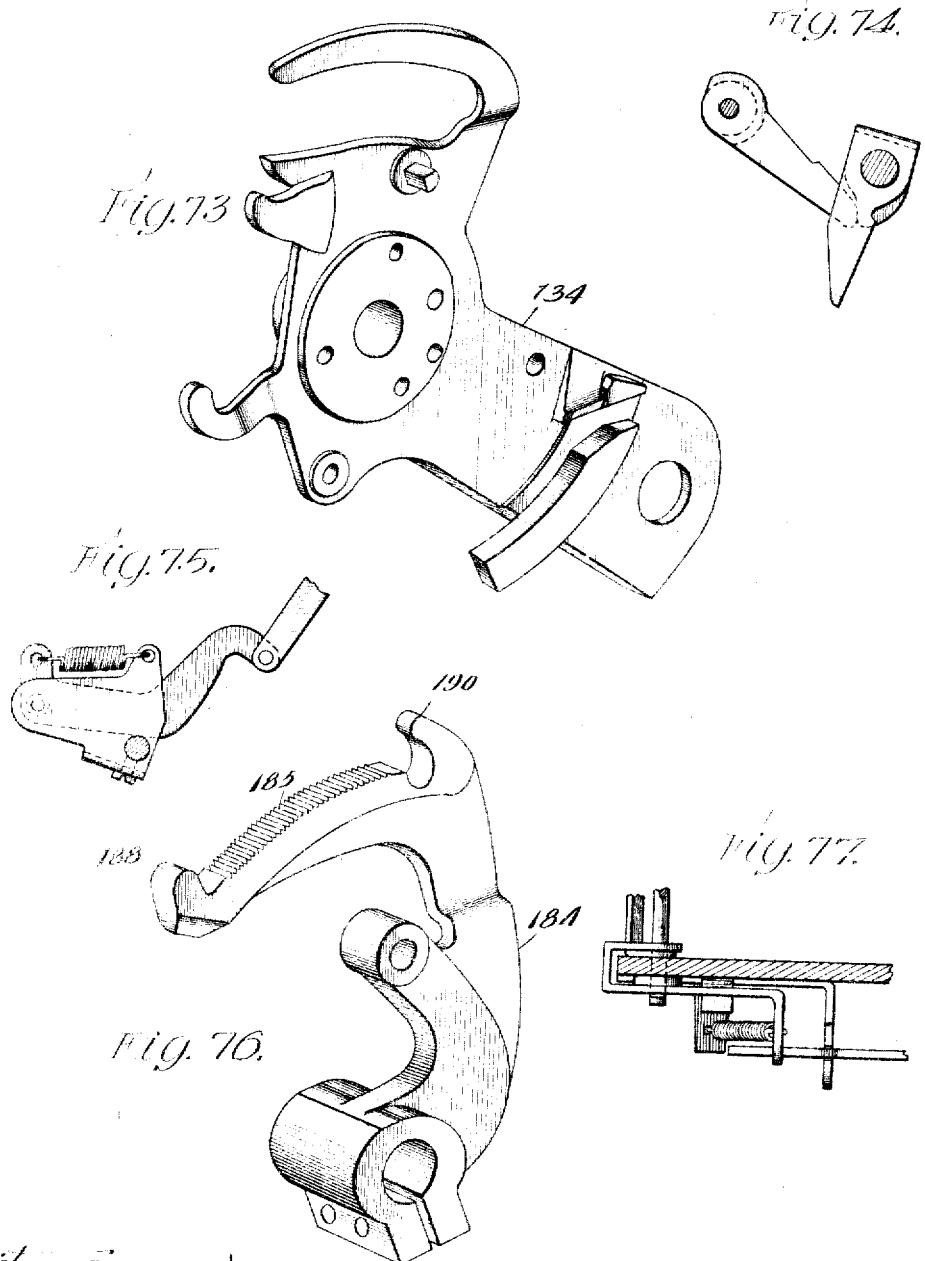

F. A. NIEMANN.
ADDING MACHINE.
APPLICATION FILED OCT. 7, 1912.

1,309,692.

Patented July 15, 1919.
32 SHEETS—SHEET 31.

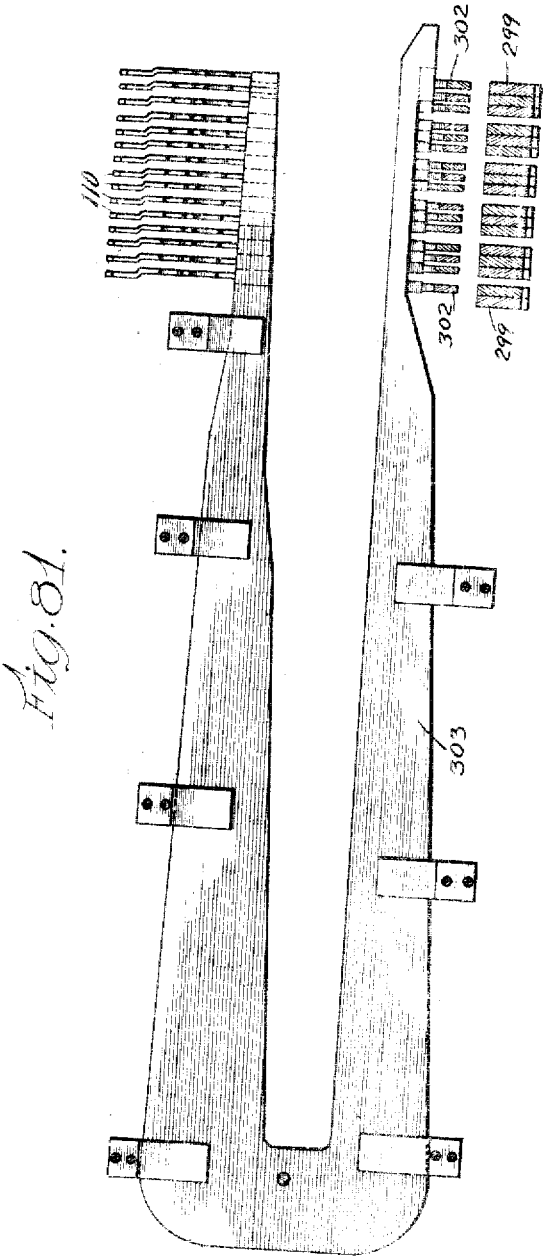

UNITED STATES PATENT OFFICE.

FREDERICK A. NIEMANN, OF CHICAGO, ILLINOIS, ASSIGNOR TO COMPTOGRAPH COMPANY, OF CHICAGO, ILLINOIS, A CORPORATION OF ILLINOIS.

ADDING-MACHINE.

1,309,692.   Specification of Letters Patent.   Patented July 15, 1919.

Application filed October 7, 1912. Serial No. 724,282.

*To all whom it may concern:*

Be it known that I, FREDERICK A. NIEMANN, a citizen of the United States, residing in Chicago, in the county of Cook and State of Illinois, have invented a new and useful Improvement in Adding-Machines, of which the following is a specification.

My invention relates to the construction and operation of the mechanism of adding machines, and more particularly to printing adding machines, and especially to the type of multiple-order keyboard recording adding machines exemplified by the well known comptograph, the general construction and operation of which is set forth in the heretofore issued comptograph patents:—to Felt, Nos. 405024; 441232; 441233; 465255; 568020; 568021; 578949; 590972; 628176; 644287; 661121; 693958; 694955; 711487; 749177; 780271; 780272 and 780273; to Felt and Wetmore, No. 853543; to Wetmore and Niemann No. 886747; to Felt and Wetmore 889671; to Wetmore, Nos. 895523 and 938532; and to Niemann Nos. 976390 and 1012698, etc. My invention is exemplified in the accompanying drawings as embodied in such a comptograph.

The main body of the machine illustrated in the drawings, is shown and described in the above-named Patent No. 853,543, issued to Felt and Wetmore on May 14, 1907. Some of the later of the other above-named patents show and describe some of the features more particularly, the Patent No. 938,532 showing and describing the main rock-shaft connections, the Patent No. 886,747 showing and describing the ink-ribbon controlling mechanism, and the Patent No. 976,390 showing and describing the motor-drive mechanism, these several features being modifications introduced intermediate the development of the machine shown in the said Felt and Wetmore Patent 853,543 and the subject-mater of the present application. The detail of the totaling mechanism described in the said Felt and Wetmore Patent 853,543, will also be further understood by reference to the other above-named Felt and Wetmore Patent No. 889,671 that issued on an application co-pending with that of the aforesaid Felt and Wetmore Patent 853,543.

The objects of my invention include:— the providing of features of construction and operation that particularly improve and increase the efficiency of such adding machines when made of extremely "wide-bank" type or with a large multiplicity of denominational orders or key-columns, as indicated in the example shown in the drawings; the providing of a form and arrangement of connections between the type heads and their operating levers that give more positive action and facilitate the employment of a large multiplicity of side by side type heads or members; the providing of an aliner device that insures the positive alinement of the printing types and particularly facilitates the use of a large multiplicity of side by side type heads or members; the providing of a governor and connections that will permit the slowing of speed during the totaling operations as compared with normal adding operations; the providing of a tail-piece construction that gives increased positiveness of action and facilitates the use of a large multiplicity of such tail-piece members; the providing of a canceling check device to aid in preventing the jerking or overspeeding of the mechanism during a canceling operation; the providing of retaining jaws or members to insure the retaining of the key-set levers in proper relation with the adding levers during the operation of the machine by its main driving shaft; the providing of devices to further insure the positive engagement of the carrying pawls with the members driven by them; the providing of mechanism to further insure against the overthrow of the numeral wheels during canceling operations; the providing of mechanism to insure the positive action of the answer pawl by which the numeral wheel is picked up and advanced during totaling operations; the providing of arrangements for timing the canceling during the return stroke of the main rock shaft of the machine; the providing of a device for preventing improper reversal of the main rock shaft before the completion of its initial stroke; the providing of more positive action of the reverse-pawl mechanism and eliminating of the torsion of the shaft controlled by it; the providing of more positive action of the paper-lock-pawl device and eliminating of the torsion of the shaft controlled by it; the providing of more positive and frictionless action of the hammer-return spring-device; the providing of means for tripping the carrying mechanism during the initial part of the return stroke of the main driving shaft of the machine, to give more time for the action of the carrying parts, especially where a great number of carryings may occur successively in a machine having a large multiplicity of denominational orders; and the providing of such other improvements in structure or function as may be found to obtain in the devices shown or described or claimed.

Figure 2:
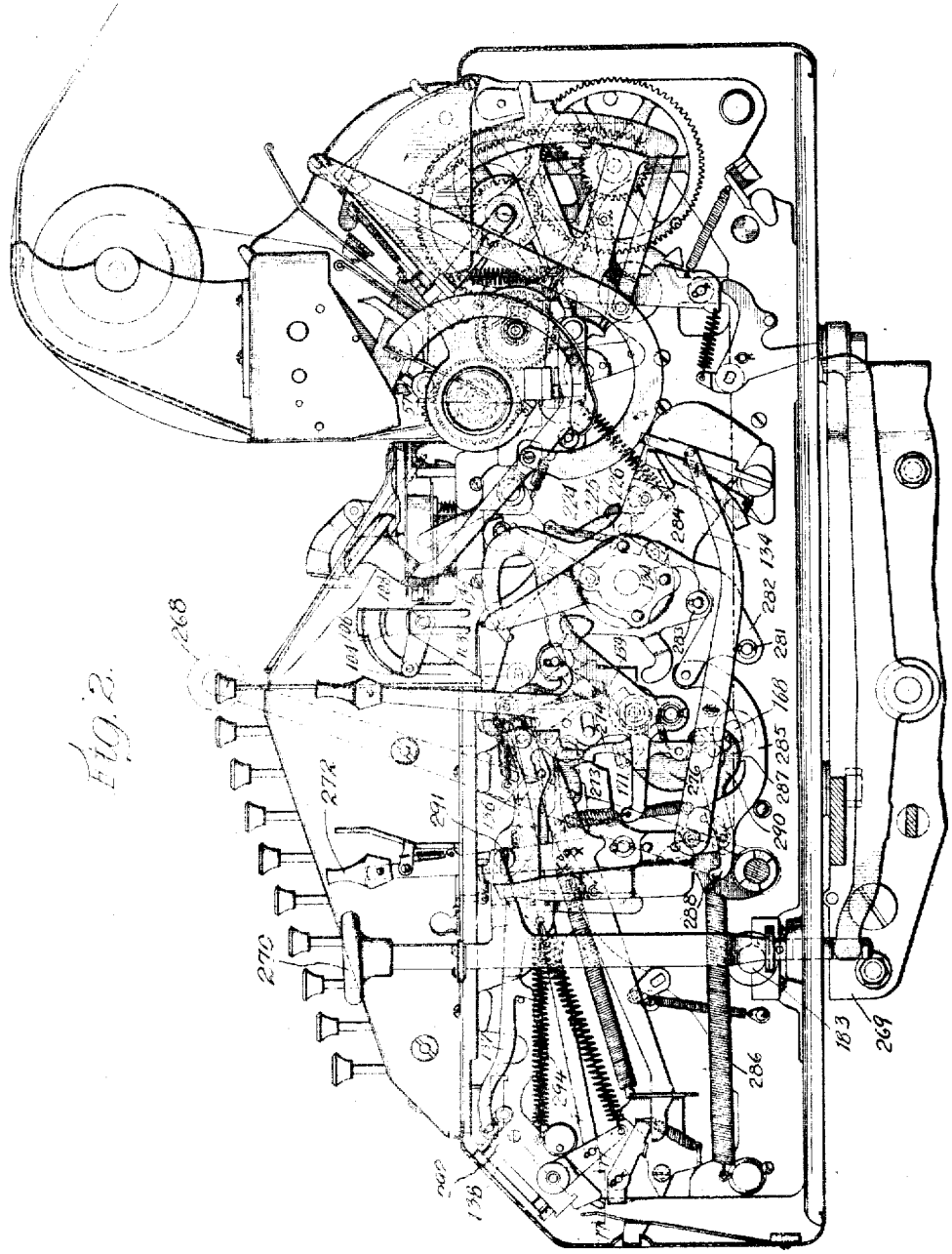
Figure 3:
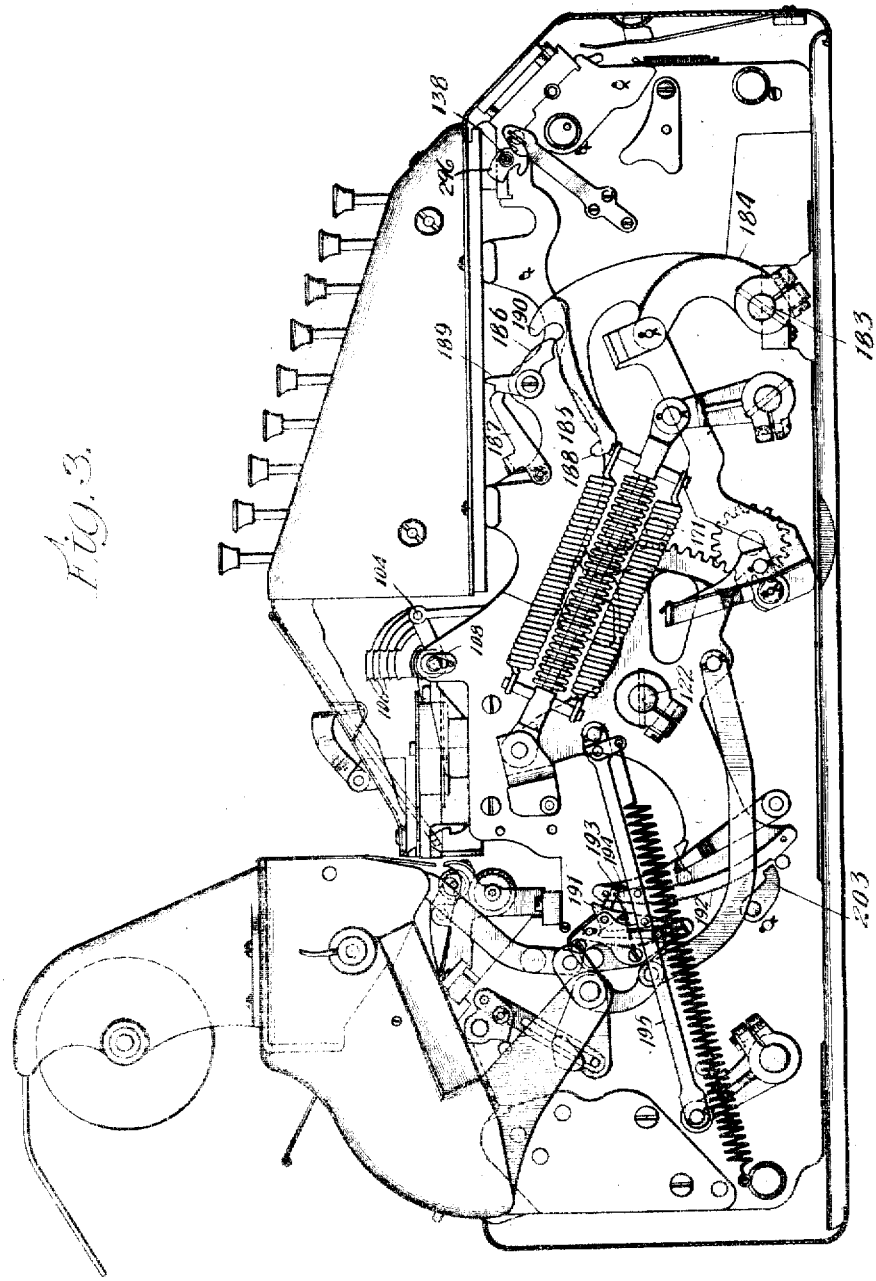
Figure 4:
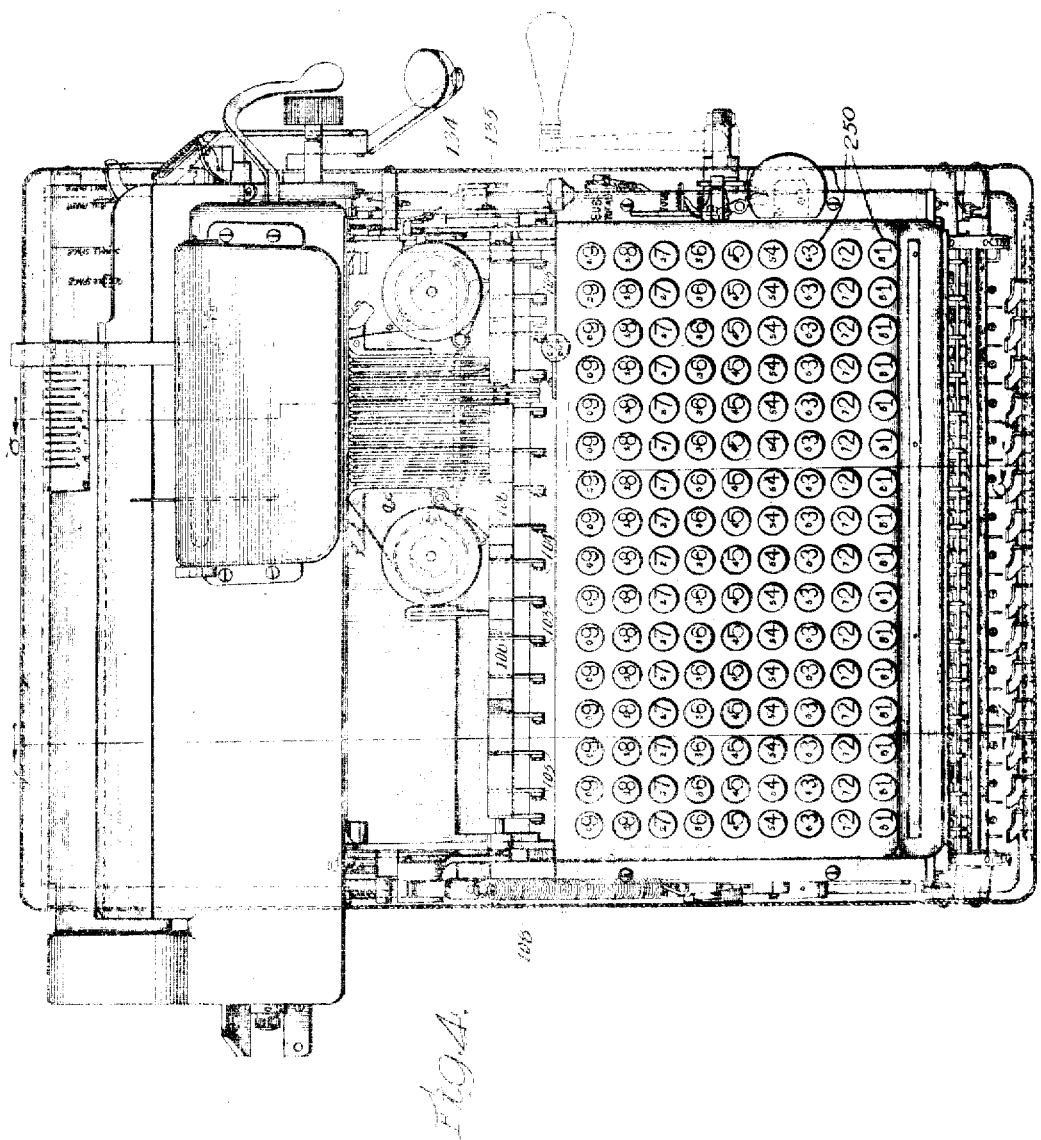
Figure 5:
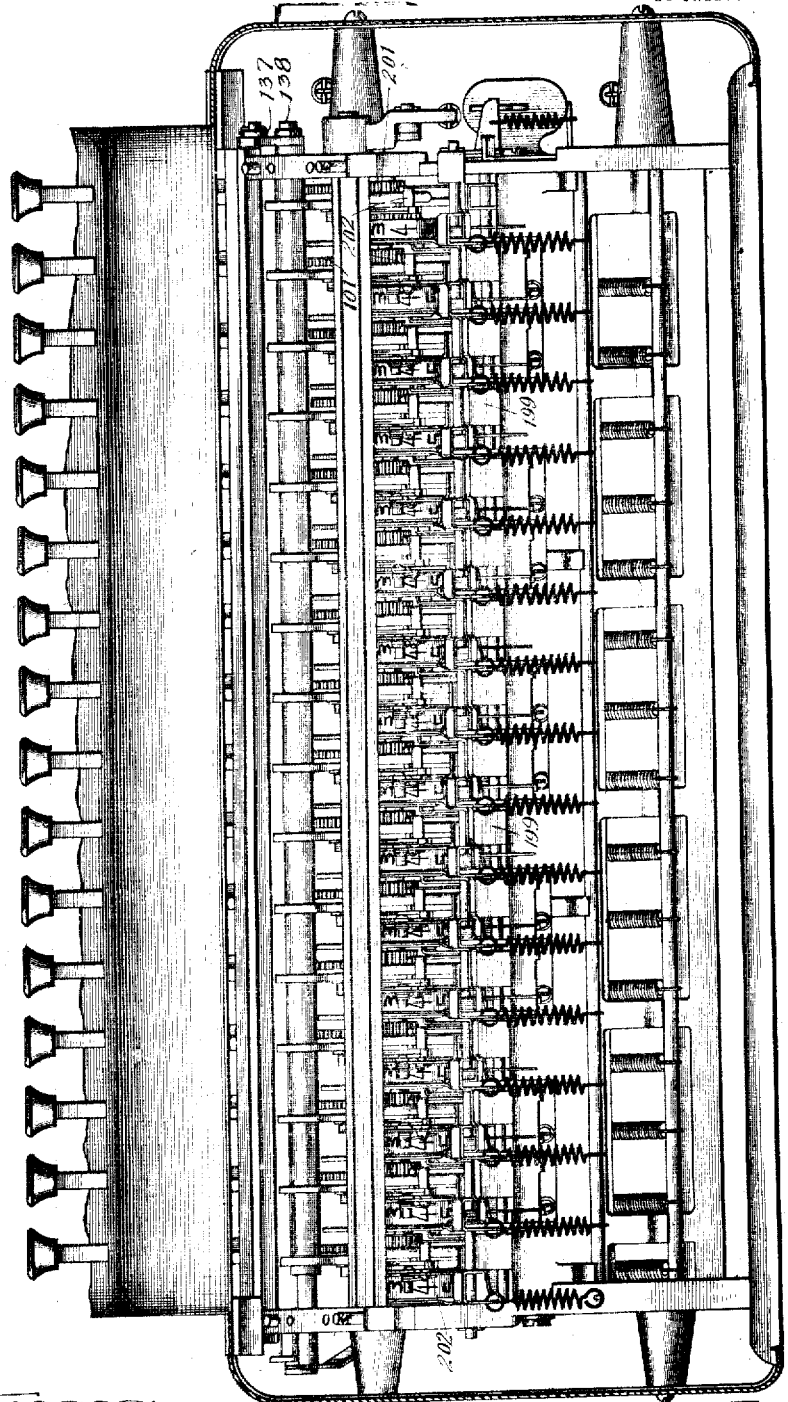
Figure 6:
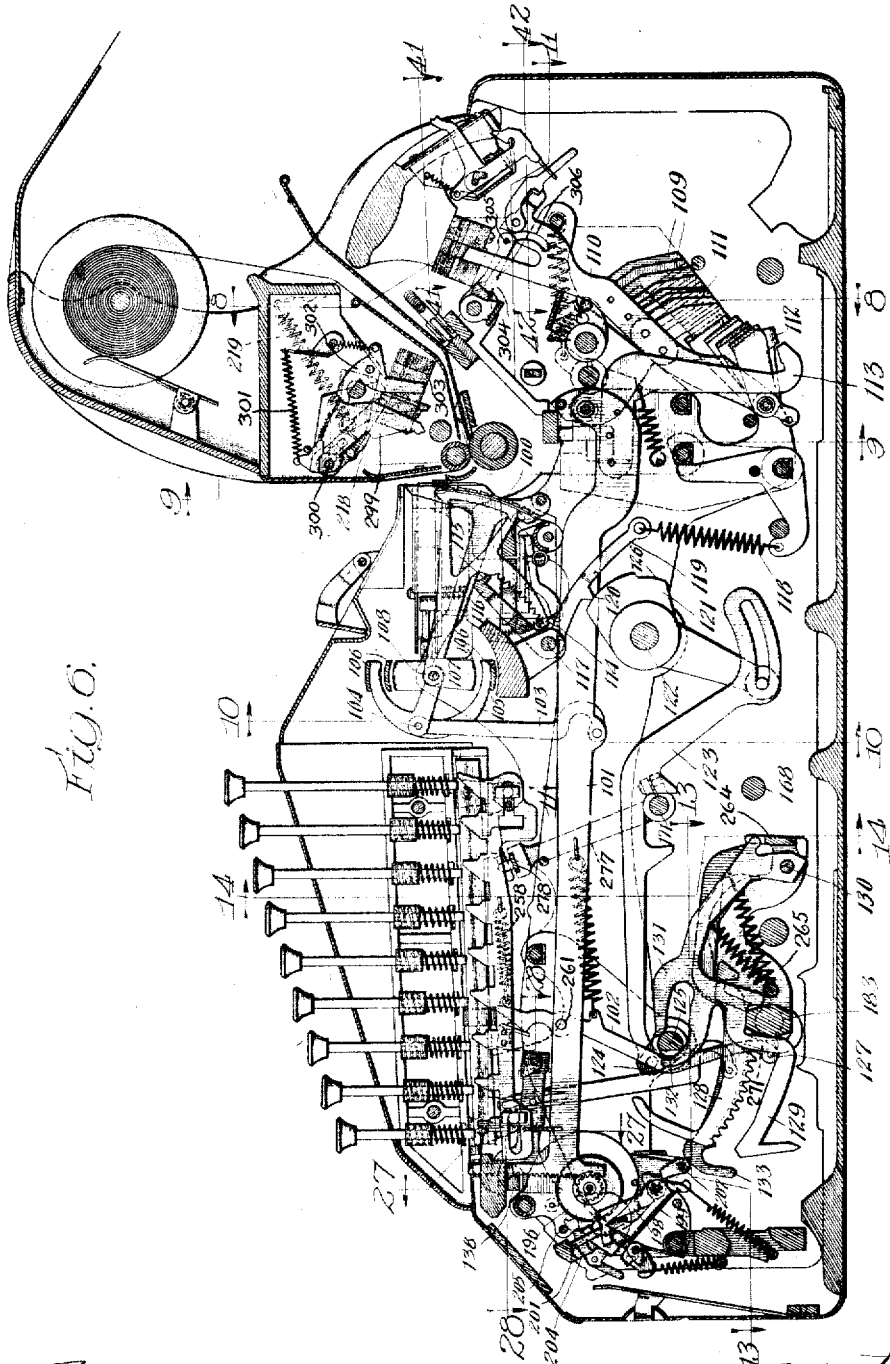
Figure 7:
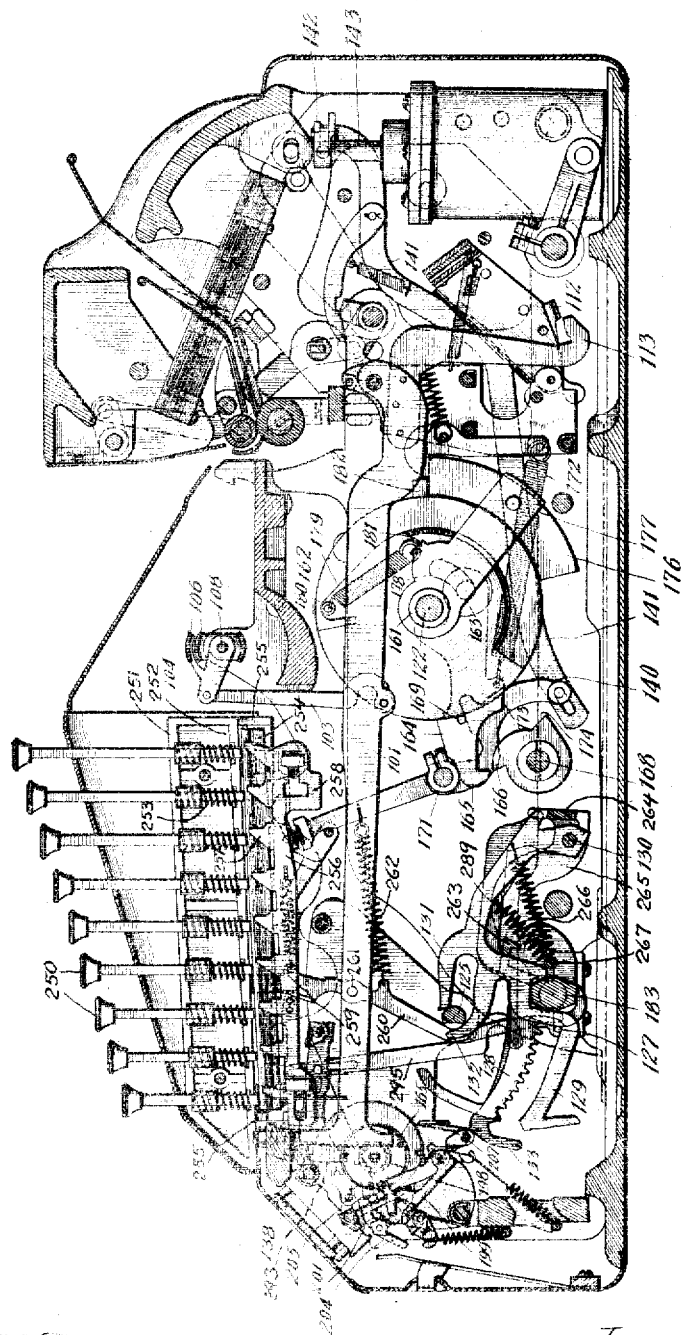
Figure 24:
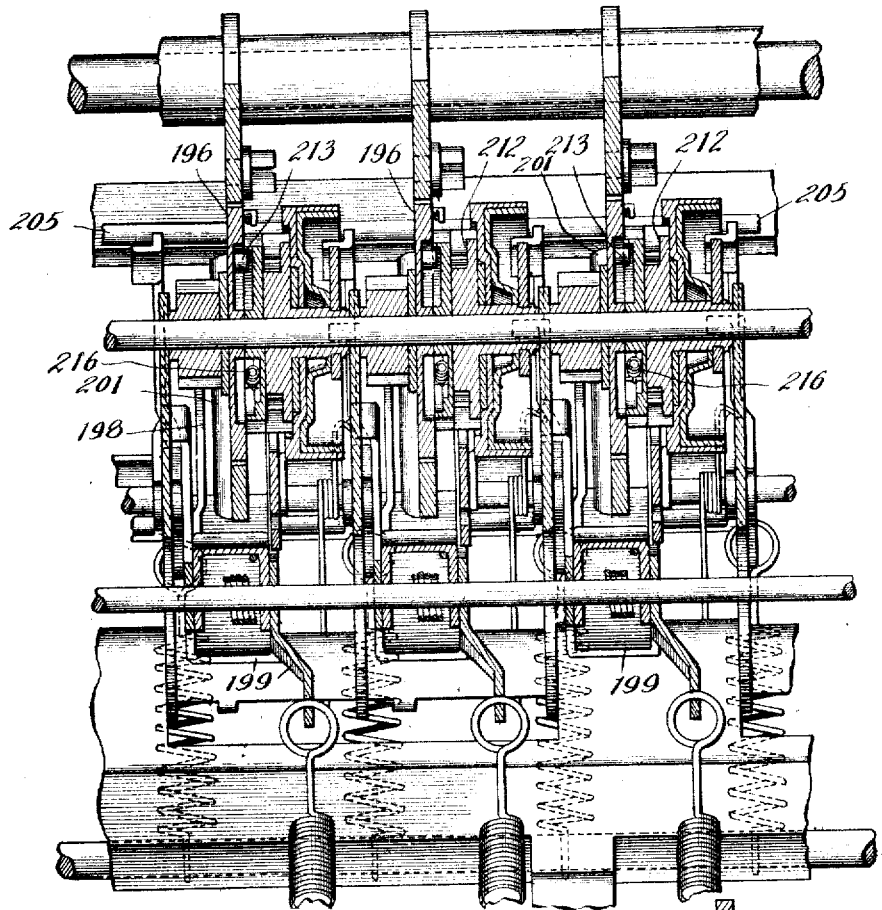
Figures 25, 26:
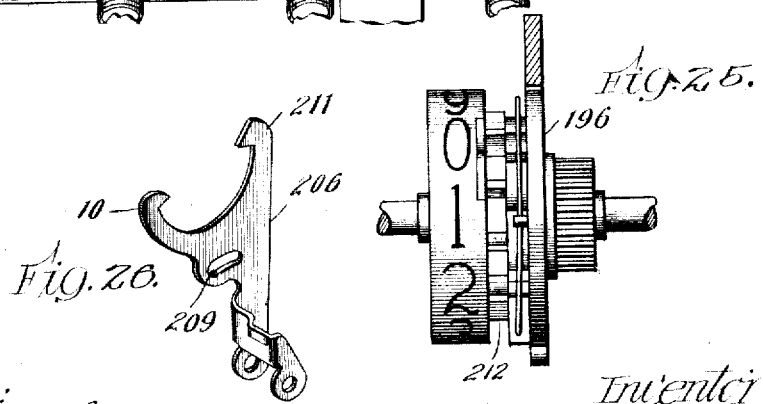
Figure 78:
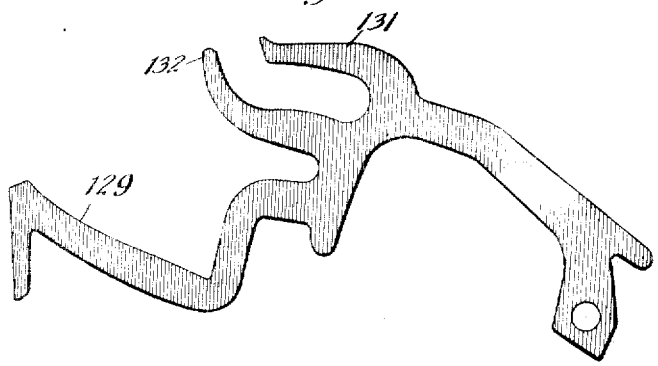
Figure 79:
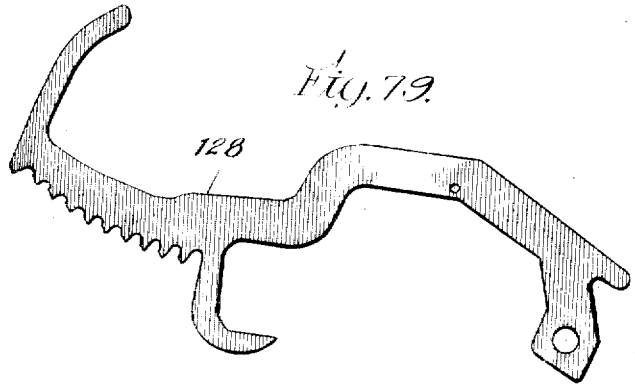
Figure 80:
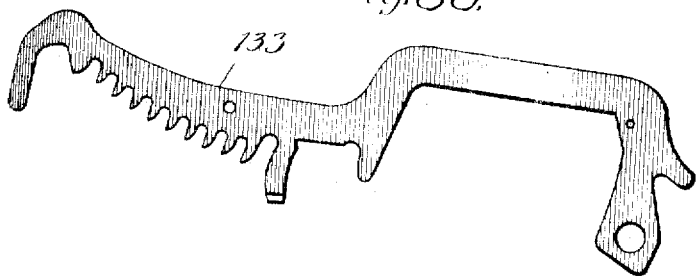

In the accompanying drawings, forming a part of this specification, and in which like reference numerals indicate like parts in all of the figures:—Figure 1 is a side elevation of the machine, and showing the driving motor and mechanism; Fig. 2 is an elevation of the right side of the machine with the outer casing partly shown in section; Fig. 3 is an elevation of the left side of the machine with the outer casing partly shown in section; Fig. 4 is a plan view of the machine; Fig. 5 is a front elevation of the machine with the outer casing partly shown in section; Fig. 6 is a sectional view on the line 6—6 of Fig. 4, in front of the 7th top-lever; Fig. 7 is a sectional view on the line 7—7 of Fig. 4, in front of the 14th top-lever; Fig. 8 is a cross sectional view on the line 8—8 of Fig. 6, looking toward the front of the machine from behind the tail pieces, U-bars and other hammer mechanism, with the paper carriage removed; Fig. 9 is a cross sectional view on the line 9—9 of Fig. 6, looking toward the back of the machine, showing the paper carriage, top-levers in section, and the printing hammers; Fig. 10 is a cross sectional view on the line 10—10 of Fig. 6, in front of the type-head construction, showing the top-levers in section and the connections from the type-heads to the top-levers in elevation; Fig. 11 is a plan sectional view on the line 11—11 of Fig. 6 at the rear end of the machine, showing the top-levers, tail-pieces, dash-pot and other mechanism; Fig. 12 is a vertical sectional view on the line 12—12 of Fig. 11, taken in front of the first top-lever, U-bars, paper-controlling mechanism and the cipher cut-out mechanism and the cipher cut-out key; Fig. 13 is a plan view on the line 13—13 of Fig. 6, showing the toothed locking members, the hexagonal rock-shaft and rock-shaft arms and top-lever locking arms; Fig. 14 is a vertical sectional view on the line 14—14 of Fig. 6, taken in front of the "7" keys, and showing the top-levers in section and the bail for returning the keys and the key locking members; Fig. 15 is an enlarged front view of the numeral wheels and carrying-mechanism; Fig. 16 is a detail view of the locking dog for locking the carrying pawl and the cam for operating the locking dog; Fig. 17 is a sectional view on the line 17—17 of Fig. 15, showing the numeral wheel, the pinion operated by the top-lever, and the carrying-mechanism; Fig. 18 is a perspective view of the carrying pawl locking dog indicated in Fig. 16; Fig. 19 is a detail view of the shifting answer-ring, and the notched disk for holding the number wheel in its initial position; Fig. 20 is a sectional view on the line 20—20 of Fig. 15, showing the escapement arm in elevation, the ratchet wheel secured to the numeral wheel, and carrying mechanism in section; Fig. 21 is a perspective view of the U-shaped carrying lever, and the carrying pawl; Fig. 22 is a perspective view of the dog or pawl which engages the notched disk to prevent over-rotation of the numeral wheel during canceling; Fig. 23 is a detail view of the numeral wheel showing the interior ratchet-wheel, and the answer pawl, and showing only the pawl and spring and sectioned pins of the driving pinion-disk; Fig. 24 is a sectional view on the line 24—24 of Fig. 17, showing the numeral wheels in cross section, the operating pinions, and the carrying mechanism; Fig. 25 is a plan detail view of the numeral wheel and the shifting answer-ring; Fig. 26 is a perspective view of the escapement pawl; Fig. 27 is a vertical section on the line 27—27 of Fig. 6, at the front end of the machine, showing the top-levers in section and the adjusting screws for the top-levers, and the shifting plates for sub-totaling; Fig. 28 is a plan section on the line 28—28 of Fig. 6, showing the same mechanism described in Fig. 27; Fig. 29 is a detail view of the reverse-pawl and its segment-ratchet; Fig. 30 is a detail view of the cam for shifting the rings used in sub-totaling; Fig. 31 is a side elevation of the mechanism used in totaling and sub-totaling, showing the totaling lever and the rock-shaft operated by the handle in the hand operated machine; Fig. 32 is a plan view of Fig. 31; Fig. 33 is a section on the line 33—33 of Fig. 31; Fig. 34 is a section on the line 34—34 of Fig. 31; Fig. 35 is a section on the line 35—35 of Fig. 31; Fig. 36 is a section on the line 36—36 of Fig. 35; Fig. 37 is a section on the line 37—37 of Fig. 11, showing the canceling-check mechanism; Fig. 38 is a section on the line 38—38 of Fig. 37; Fig. 39 is a section on the line 39—39 of Fig. 37; Fig. 40 is a section on the line 40—40 of Fig. 39; Fig. 41 is a plan section on the line 41—41 of Fig. 6, showing the cipher-cut-out mechanism and the tail pieces; Fig. 42 is a plan section on the line 42—42 of Fig. 6, showing the connecting levers to the tail-pieces, from the cipher cut-out mechanism; Fig. 43 is a perspective view of one of the arms for disconnecting the tail-piece connecting-lever; Fig. 44 is a perspective view of one of the tail-piece connecting-levers; Fig. 45 is a perspective view of the bail or returning member for returning the arms indicated in Fig. 42; Fig. 46 is a vertical section of the governor dashpot; Fig. 47 is a section on the line 47—47 of Fig. 46; Fig. 48 is a section on the line 48—48 of Fig. 6; Fig. 49 is a section on the line 49—49 of Fig. 46; Fig. 50 is a section on the line 50—50 of Fig. 49; Fig. 51 is a section on the line 51—51 of Fig. 49; Fig. 52 is a detail section of the paper-roll feeding-ratchet and dog, and of the automatic paper-lock mechanism of the machine, acting when no paper is in printing position; Fig. 53 is a perspective view of the arm for locking the paper-roll ratchet; Fig. 54 is a section on the line 54—54 of Fig. 52; Fig. 55 is a detail view of the cam which is secured to the paper-return lever-shaft; Fig. 56 is a plan section of the paper-control arm secured to the paper-carriage column-ratchet; Fig. 57 is a sectional view on the line 57—57 of Fig. 2, showing the knob for turning the paper-roll and the gear for driving the same; Fig. 58 is a plan view of the mechanism for shifting the paper-carriage column-ratchet laterally and the ratchet mechanism for turning the paper roll axially; Fig. 59 is a section on the line 59—59 of Fig. 58; Fig. 60 is a bottom plan view of the ribbon frame and mechanism for feeding and reversing the ribbon-rolls; Fig. 61 is a section on the line 61—61 of Fig. 60; Fig. 62 is an end view of the ribbon frame and mechanism on the feeding side; Fig. 63 is a detail view of the dash-pot crank shaft bearing; Fig. 64 is a section on the line 64—64 of Fig. 63; Fig. 65 is a perspective view of one of the tail-pieces and its tail-piece lever; Fig. 66 is a perspective view of the bail for returning the printing hammers; Figs. 67, 68 and 69 are details of the spring clips for the springs of said hammer-return bails; Fig. 70 is a detail view of the units tail-piece lever; Fig. 71 is a perspective view of the type-head aliner; Fig. 72 is a perspective view of one of the type-heads; Fig. 73 is a perspective view of the large main operating cam; Fig. 74 is a detail section on the line 74—74 of Fig. 9, showing the arms for returning the U-bars to normal; Fig. 75 is a section on the line 75—75 of Fig. 9 showing the dog connected to the paper-lock shaft; Fig. 76 is a perspective view of the rock shaft segment ratchet; Fig. 77 is a plan section on the line 77—77 of Fig. 2, showing the arm for setting off the units-wheel carrying-mechanism; Figs. 78, 79 and 80 are detail views of one each of, respectively, the top-lever locking-jaw arms and adding-arms and answer-arms; Fig. 81 is a top plan view of the U-bars and tail-piece levers, with the hammer-latches and hammers indicated in section.

The machine embodies any desired number of denominations, and in each denomination are nine digital keys shown at 250 (Figs. 4, 7), arranged in rows extending backward from the front of the machine. The stems of these keys extend downward between pairs of guide plates, 251, 252 (Fig. 7), and are provided with lifting springs 253 on the plates 252 (Fig. 7). Below each denominational series of keys is a key-locking plate 254 (Figs. 7, 14), hinged at its ends in the ends of the key frames as seen at 255 (Fig. 7), so that the plate may be swung laterally by the keys when the latter are depressed, each plate being provided with springs (Fig. 14) pressing it toward the keys, so that when deflected by the descent of any key, the plate will swing back under the power of its spring and lock the key as soon as its bent end has passed below the plate. The keys which are locked by these plates remain under their control until released by the striking of another key in the same denomination, or by the operation of the releasing lever, or in the adding operation. Directly below each denominational row of keys is also located a bar 256 having freedom to move longitudinally. It is provided with nine inclines or cams 257 (Fig. 7), one below each key embraced in the denomination, and the inclines are graduated in length according to the power of the keys under which they are located, the incline under the "9" key being long, and that under the "8" key being somewhat shorter and so on gradually diminishing in length to the incline under the units key, which is quite short. The inclines are located directly under the keys so that when the latter are struck, they come against the inclines and give longitudinal motion to the bar for a distance corresponding to the length of the incline. The variable and graduated movements of the bar received from the keys determine the action of the adding and printing mechanism, as will be further understood. The bars are returned to their normal positions by springs 258 (Fig. 6) which are attached to the frame and the bars, but the bars are detained in their shifted positions by the keys as long as the latter remain depressed. Attached to each bar is a laterally projecting wing 259 (Fig. 7), which at each impulse given the bar by a key comes against the upper end of a movable and variably acting link 260. This link is attached at 261 to the segment-lever 101 by which the corresponding numeral-wheel is actuated, and by which the corresponding type segment 100 (Fig. 6) is positioned properly for printing the amount added. A spring 262 acts on the link and returns it to normal position after each depression. The movement received by the link from the bar 256 positions the lower end of the link varyingly in accordance with the power of the key by which the bar is actuated, and brings the laterally projecting pin 127 (Fig. 7) on the link under or in proximity to one of the notches in the lower edge of the arm 128, corresponding to said key. This arm 128 is arranged in the denominational line and provided with a series of nine of said notches that correspond to the keys of the denomination and form a sort of rack, one notch, at the rear, being deeper than the others and having a depending guard projection at the back o' it (Figs. 6, 7, and 79). There is one such arm for each denomination, and the series of them is supported on the rock shaft 183 (Figs. 6, 7) which may be called the main actuator. The numeral arms are positioned on the main actuator by the slotted cross-bars 263, 264 carried on arms 265 (Figs. 6, 7) secured to the actuator and with the notched portion of the numeral arms 128 projecting forwardly of said main actuator and their rear ends, which are forked, straddling the cross-rods 130 secured in the ends of the arms 265. A spring 266 extends from each numeral arm forwardly and downwardly to the cross-rod 267 also inserted in the arms 265.

The main actuator is rocked by power from a suitable hand-lever 268 (Figs. 1, 2) or by the motor-drive device 269 (Figs. 1, 2) by which the machine may be operated. This motor-drive device is the same motor-drive that is shown in applicant's Patent 976390 of November 22, 1910, and is connected with the adding-machine in the same way, and is tripped by the same form or motor-key 270 (Fig. 2).

The rocking of the main actuator 183 which occurs at each stroke or operation of the hand-lever or power device will impart a vibratory motion through an arc to the notched ends of the numeral arms 128, and such vibratory motions will be uniform in extent except as they may be varied by the yielding of the springs 266. In this vibratory movement, the notched or graduated portion of the numeral arms encounters the pins 127 on such of the links 260 (Fig. 7) as have been positioned by the striking of the keys, and such pins enter the notches that correspond to the keys struck. With the pins centered in the notches the main actuator completes the movement imparted to it by the power device, and in so doing, carries down the arms 128 and the latter carry with them the variable links 260 whose pins 127 are centered in the said notches. The variable links give motion in turn to the segment-levers or top-levers 101, the extent of which motion is dependent upon the position of the notches in which the pins 127 are entered; and because of the variable movement of said links 260, the segment-levers are actuated in accordance with the power of the keys and are thus adapted to add the amount represented by the depressed keys upon the register wheels, and also to position the type for printing the same amount. When the pins 127 stand under the deep rear notches of the arms 128, the vibration of the arm will be idle, as the deep notches permit full strokes to take place without engaging said pins 127 (Figs. 6, 7). The depending guard projections 271 (Fig. 6) on the arms 128, just at the rear of their notches, prevent any tendency by the links to swing too far backward.

The releasing of the depressed keys may be caused by the swinging lever 272 (Fig. 2) which has an arm 273 bearing against the upper end of a swinging lever 274, loose on rock shaft 171 (Figs. 2, 14), but operating said shaft in one direction by means of a laterally projecting pin 275 (Fig. 14) engaging the crank 276 (Figs. 2, 14) fast on said shaft 171. The shaft 171 extends across the machine and is provided with a number of arms 277 (Figs. 6, 14) on which is secured a cross-bar or plate 278 having teeth 279 projecting upwardly from it. There is one tooth 279 for each domination, and each tooth is arranged to bear against a curved portion 280 (Fig. 14) upon a corresponding locking-plate 254 in such manner that when the shaft 171 is rocked, the tooth 279 will be forced against the curved portion 280 and swing the plate 254 away from its acting position, and thereby cause the release of any keys which may be locked at the time. To effect this release which is given to all the plates, the lever 272 (Fig. 2) is swung toward the rear from its intermediate position. Portions of this same mechanism are utilized in effecting the release of the keys at the conclusion of each printing operation, by the following means: Pivoted at 281 is an irregular shaped plate 282 controlled by the roller 283 (Fig. 2) on the cam 284, denominated the main cam. A link 285 is attached to this plate 282 and spring 286 draws the link toward the front of the machine. Upon the upper edge of said link is a shoulder 287, which, when the link is drawn rearwardly by the motion received from the cam 284, is engaged by the lower end of lever 274, when the main cam returns to normal position. When the main cam returns to normal position, it allows said link 285 to return forwardly in obedience to spring 286, and in so doing, the said link carries the lever 274 with it for a short distance and until it slips out of engagement by reason of the depressing of said link 285 by a projection on the lower end of the lever 272 making contact with the inclined upper edge of the forward end 288 (Fig. 31) of said link 285. This movement of the lever 274 rocks the shaft 171 (Fig. 14) sufficiently to release the keys through the medium of the teeth 279 and curved parts 280 already described. The lever 272 is also employed to throw the releasing mechanism out of service when it is desired to repeat numbers, and for this purpose is swung toward the front of the machine, and in assuming this position the arm 273 is so far withdrawn from the lever 274 as to allow the latter to rock on its pivot, and this movement carries the lower end of said lever 274 far enough toward the rear of the machine so that engagement between said lever 274 and the aforesaid shoulder 287, on link 285, is prevented, and consequently shaft 171 remains idle during the repeating, and none of the operations above described and usually performed by it take place. The lever 270 is also capable of being moved to a third position, and it is so moved when the answer or total is to be printed. In this position, the upper end of lever 272 is moved toward the rear of the machine, and the projection 273 pushes the lever 274 so far that the hook of said lever 274 sets over the aforesaid projection 287 and locks the lever in its new position. This lock remains in force until released by the link 285 upon the conclusion of the answer printing operation. In setting the lever 272 for answer printing, the link 290 (Fig. 2) which connects the free end of crank 276 with the lower end of lever 272, imparts a greater rocking motion to shaft 171 than it receives in the ways previously described, and in this rocking movement the plate 278 engages the proximate edges of the depending portions of the cam bars 258, just to the rear of said plate 278 (Figs. 6, 7), and carries all said bars 258 toward the rear of the machine sufficiently to bring the spaces between the inclines 257 (Fig. 7) under the keys, so that if the keys are then depressed no result will be produced beyond the idle descent of the key. In this same movement of plate 278 the teeth 279 act on the locking-plates 254 and swing them away from the keys, and any keys which may be down at the time will be released. The link 290 (Fig. 31) is slotted where it is joined to the lever 272 so that the link need not change position when the lever is set for repeating. The increased movement given the bars 258, as just stated, also causes an increased swinging movement by the variable links 260 (Fig. 7) or 102 (Fig. 6), which carries their pins 127 beyond the notched arms 128. As the pins 127 project on both sides of the variable link, they are adapted, when thus positioned, to engage the spring depressed arms 133 (Figs. 6, 7 and 80) which in some respects are similar in size and shape to the arms 128 and are arranged parallel to the latter, and they are supported on the main actuator 183 and positioned by the plates 263, 264 in much the same way as the adding arms 128, and each is also provided with a spring 289 attached to the cross-rod 267 to hold it to the actuator. The answer arms 133 are provided with depending guard projections at their forward ends (Figs. 6, 7 and 80) which act as stops to the pins 127 and prevent the links from moving too far when positioned by the cam-bar 258. The totals or answers are printed with the lever 272 set as above described and by operating the hand-lever 268 or motor-drive 269, which power device imparts a rocking motion to the main actuator. This rocking of the main actuator carries the answer arms 133 (Figs. 6, 7 and 80) downward for variable distances, their springs 289 (Fig. 7) yielding so that the partial strokes are permitted. The length of the strokes depends on the position of the numeral-wheels at the time and the segment-levers 101 are arrested when they have moved far enough to position, in the printing line, the type heads 100, 100 corresponding to the numbers exposed on the numeral wheels.

When the lever 272 is set for printing the totals, it carries with it a bar 137 (Fig. 2) having in its rear end a slot in which is engaged a pin 291 (Figs. 2, 31) carried by the lever 272, the slot being adapted to permit changes in the position of the lever when it is shifted to secure repetitions and to cause the release of depressed keys without affecting the said bar. This bar 137 at its forward end is attached to a crank 292 (Fig. 2) on a rock shaft 138 extending across the machine and located over the series of numeral-wheels. The shaft 138 is angular (Fig. 17), so that when rocked it is adapted to depress the series of locking stop-levers 293 (Fig. 17), pivoted at their rear ends on a cross-rod of the machine, and to force said stop-levers to engage the numeral-wheels. In this manner the numeral-wheels are absolutely locked by the setting of lever 272 for answer printing and remain so until released. The stop-levers engage the teeth of the ratchet 212 (Figs. 17, 15) that is fast upon the numeral-wheels. The shaft 138 and the bar 137 are returned to normal position by the spring 294 (Fig. 2). The series of locking levers 293 is also connected to the answer arms 133 by the vertical links 295 (Fig. 7). Said links are slotted at their upper ends and pins on said stop-levers 293 enter the slots. By this construction the said stop-levers 293 are forced to arrest the rotation of the numeral-wheel in key-printing near the end of the forward stroke of the main lever or handle but before the printing hammers have been released. The shaft 138 carries at its further end a cam 296 (Fig. 3) which works in a slot formed in the bar extending across the series of numeral-wheels and carrying the series of answer rings that co-act with the answer-pawls 215 (Fig. 23) whose operation is more particularly described in a further portion of this specification. There is one of these rings for each denomination and they are adapted to move over the pinion disk that bears the pin 213 (Fig. 23), there being one of said disks attached to each of the numeral-wheel pinions (Figs. 24, 25), and hold the pawls 297 (Fig. 23) on said disks out of action while the pinions and disks are being rotated by the segment-levers 101 in positioning the type for answer printing. During this independent operation of the pinions and disks, the numeral-wheels are locked by the stop-levers 293, as already described. And the rotation continues until the laterally projecting pins 213 on the side of the disks encounter the answer-pawls 215 (Fig. 23) whose spring action, in respect to their springs 216, is more particularly described in a later paragraph of this specification. This spring 216 allows the answer-pawl to yield to the pin 213 when the latter moves in one direction, but the pin engages said stop so as to carry the answer-pawl, and the connected ratchet (Fig. 23), with the disk that carries the pin 213, when the movement is in the other direction. The disk is turned during this independent rotation in the direction in which the pin 213 engages the answer-pawl 215 and as soon as the engagement takes place the rotation of the disk is arrested because the numeral-wheels are already locked. This arrest takes place sooner or later according to the position occupied by the numeral-wheel at the time. Thus, if the wheel stands at "1," the arrest will take place early in the rotation of the disk. If it stands at "2," the disk will be permitted further rotation, and at "3" still more, and so on. And at the time of the arrest the type 100 will have been positioned at the printing line in accordance with the numbers shown at the sight opening upon the numeral-wheels so that the totals can be printed by releasing the hammers. The springs upon the answer-arms 133 (Fig. 7) accommodate any further movement of the main actuator 183 after the segment-lever 101 and its numeral-wheel pinion have been arrested, as just described. When the total is printed, it may be followed by an automatic canceling operation. The action by which the main cam 284 shifts the link 137 (Fig. 2) and effects the return movement of the shaft 138, is more particularly described in a subsequent paragraph of this specification. The shaft 138 is provided with the upwardly projecting pins 298 (Fig. 17), in alinement with the stop-levers 293, and these pins engage the overhanging horns of said stop-levers and lift them when said shaft 138 is rotated back toward its normal position. When the numeral-wheels are released, the canceling is effected as the numeral-wheels are moved, from the position they then occupy by the power exerted on the segment-levers 101 by the springs 266 which have been strained by the arresting of the disks in the above described totaling operation. This rotation of the wheels carries the unit wheel to the zero position and all the other wheels to the "9" position, and in the passing of the unit wheel to the zero position, the usual carrying transfer from it effects the carrying of the higher numeral-wheels to the zero position.

The printing hammers are shown at 299 (Fig. 6), swinging upon a shaft 300, and are actuated by springs 301. The hammers are normally held by triggers 302 which are released by releasing frames 303 (Figs. 6, 12 and 81) and are raised after each printing operation by a swinging frame or bail 218 (Figs. 8, 12 and 66) whose action is more particularly described in a later paragraph of this specification. The releasing frames 303 are actuated by the tail-piece levers 110 (Figs. 8, 6), one for each denominational order, and these tail-piece levers 110 are connected to the tail-pieces 109 (Figs. 8, 6, 12) which are telescopically nested in the manner shown in Fig. 8 and particularly described in a subsequent paragraph of this specification. And, as there also described, the said tail-pieces 109, with their attached levers 110, are individually moved by the cam arms 113 (Figs. 6, 12, 8) depending from the rear ends of the segment-levers or top-levers 101; so that those tail-piece levers are shifted which correspond to the segment-levers 101 that are depressed at any given operation of the machine; and the tail-piece levers 110 that are thus shifted effect the shifting of the corresponding releasing frames 303 (Fig. 8) and thereby effect the release of the denominationally corresponding triggers 302 for the printing hammers 299 (Figs. 6, 8 and 81). The full swing of the tail-piece levers 110, necessary to effect the trigger releasing action of the releasing frames 303 is accomplished by the downward swinging of the rock frame 304 whose cross-bar 305 engages the slot 306 (Fig. 6) in each tail-piece lever 110 that has been rocked forward by the aforesaid segment-lever action. The shaft 307 (Fig. 8) on which the rock frame 304 is secured, is rocked at each actuation of the machine. The setting of the type heads 100 so that the proper types are brought to the printing line, through the connections of said type heads with the links 103 that connect with the respective segment-levers or top-levers 101 (Fig. 12), is detailed in the next following paragraph.

100, 100 are the type-heads (Figs. 4, 6, 9, 72), arranged in a gang or battery, one for each printing order of the machine. 101, 101 are the top-levers (Figs. 6, 7, 10, 11, 12, 13, 14), whose forward ends bear the segment gears for actuating the numeral wheels, and whose rearward portions bear the connections for setting the type-heads and tripping the printing hammers, and whose extent of movement in each column is determined by the key-set positioning of the top-lever connections 102, 102, (corresponding with the links whose action is described at lines 31 et seq. of page 2 of the aforesaid Patent No. 853543). The series of these top-levers is of course distributed across the entire width of the machine, while the gang of type heads are congested into a narrow space of the width of a single printing column, the width of a number item of not to exceed seventeen figures in the machine shown in the drawings. These widely distributed top-levers must be so connected with the type-heads that they may independently move their respective type-heads, and yet lost motion and torsion in the connections must be eliminated. Each top-lever has pivotally connected to it, somewhat to the rear of the middle of its length, an upwardly extending link 103 whose upper end is pivotally connected, at 104, to the arm 105 of the type-head connection member 106, whose other end is the arm 107 (Fig. 72) connected rigidly with the end of the segment-formed type-head itself. The two arms 105 and 107 of the type-head connection are pivotally mounted on the type-head shaft 108, so that the type-head connection may oscillate through a limited arc, swinging the type-head to present one or another of the types at the printing point. The member joining the two said end arms of each type-head connection is at right angles to said arms and is of sheet metal formed to an arc of curvature corresponding with the arc in which the said connection member swings. These several connection members are of various lengths, adapting them to span the space between the planes of up and down movement of the respective top-levers that swing them and the type-heads that are swung by them, and are all mounted on the same type-head shaft, transverse of the machine, and arranged thereon in two series, an upper series above said shaft and a lower series below said shaft, and in two groups, a right hand group for the five right hand top-levers and type-heads and a left hand group for the rest of the top-levers and type-heads, twelve in number (Fig. 10). And in each of said groups in each of said series, these type-head connections are telescopically nested with each other, so that each may be swung independently of and without interference to the others. The principle is capable of extension to even a greater number of type-head members than are present in the machine shown in the accompanying drawings.

The tail-pieces 109, 109, connected with the tail-piece levers 110, 110 (Figs. 65, 6, 7, 8, 11, 12), which correspond with the parts whose action is described at lines 14 et seq. of page 5 of the aforesaid Patent No. 644287, are telescopically nested somewhat similarly to the above described type-head connections, and arranged in a right hand and left hand group (Fig. 8), though all of one series; and each tail-piece has an upwardly bent arm 111 rigidly connected to its tail-piece lever, and a downwardly bent arm 112 whose free end receives and transmits the hammer-tripping actuation from the cam-arm 113 that depends from the rear end of the top-lever of corresponding order. The two arms 111 and 112 of each tail-piece are connected by a flat metal strip that swings edgewise in the arc of a circle as the said free arm 112 is cammed by the said corresponding cam arm 113; and these flat members joining the end arms of the tail pieces are disposed flatwise one over another, as indicated in Figs. 6, 7 and 8, so that each tail-piece may be swung through its required arc of movement independently of the other tail-pieces. And to accommodate this nesting of the tail-pieces, the cam arms 113 depending from the top-levers are brought down from the rear ends of the top-levers to the front of and thence up under the groups of tail-pieces, as indicated in Figs. 6, 7 and 12. In this manner even a greater number of tail-pieces than are shown in the accompanying drawings may be provided, to accommodate the tripping of tail-piece levers for an even greater number of type-heads.

To insure a positive alining of the type-heads after they have been swung by the action of the top-levers, and before the type hammers are tripped by the action of the tail pieces, each type-head is provided with an independent segment-formed toothed rack-arm 114 adapted to be engaged by the tooth rib 115 of the type-head aliner 116 (Figs. 72, 71, 6, 12), which is common to and transverse of the entire gang of type-heads, and is mounted to oscillate on the shaft 117, transverse of the machine, being actuated by the pull of the spring 118 (Fig. 6) on the free end of the arm 119, whose other end is rigidly connected with said aliner, and which is normally held raised by the contact of the projection 120, from the lower edge of the middle portion of said arm, with the high part of the swinging cam 121 that oscillates on the shaft 122 and is actuated by the link 123 leading forward to the crank arm 124 on one of the rocking shafts, 125, of the machine. The oscillation of the said cam 121 is so timed that the said projection 120 of the aliner arm 119, drops off the high part, and down to the low part 126, of said cam after the type heads have been swung by the top-levers and before the printing hammers are tripped.

To prevent the lateral pin 127 on the free end of the top-lever connection 102 (Fig. 7) from jumping out of proper engagement with any notch of the adding arm 128 (Fig. 79), which are parts corresponding with those whose action is described at lines 44 et seq. of page 2 of the aforesaid Patent No. 853543, there is provided an alligator-jaw member 129 (Fig. 78), pivoted to oscillate on the shaft 130 and timed to be lifted just after said pin 127 has been thrown into engagement with the proper notch of said adding arm, and to be depressed just before said pin is due to be disengaged after the adding operation, said lifting and depressing being effected by the swinging forward of the same locking member that carries the shaft 130 on which the adding arm is also pivotally mounted, the said alligator jaw member being guided by the movement of its upper forwardly projecting arms 131 and 132 (Fig. 78) over the rocking D-shaped shaft 125 (Figs. 6, 7).

To insure the proper engagement of the aforesaid top-lever connection pin 127 with the teeth of the adding arm 128, so that said pin may never be dead-centered on the apex of one of said teeth, the answer arm 133 (Fig. 80), corresponding with the device whose action is described at lines 121 et seq. of page 3 of the aforesaid Patent No. 853543, is provided with a row of downwardly projecting teeth substantially paralleling and corresponding with, but longer than, the teeth on the adding arm 128, and the apices of the said teeth on the adding arm 128 are so shaped as to tend to cam the said pin 127 forward if it dead-centers on and lifts the apex of the corresponding longer tooth on the said answer arm 133, thus insuring the entry of the said pin 127 into the proper notch of the adding arm 128, the latter arm being always free to move on its pivot before the adding arm makes contact with said pin 127. The alligator jaw member 129 closes up upon the adding arm 128 and answer arm 133 after the pin 127 is properly positioned (Figs. 6, 7).

To provide for timing the canceling (whose general action is described at lines 121 et seq. of page 4 of the aforesaid Patent No. 853543) to occur during the return stroke of the handle crank of the machine, the main cam, 134 (Fig. 73), of the machine has secured to it the arm 135 (Fig. 2) whose forward free end is adapted to make contact with and lift the shoulder at the lower rear end of the swinging pawl 136 on the rear end of the connection link 137 that leads forward to and actuates the worm shaft 138 for shifting the answer-rings during canceling. When the total lever is not set, the said pawl 136 lies entirely forward of the path of the swing of the said lifting arm 135; and when the sub-total lever is set, the pin 139 on said lever swings the aforesaid shoulder of said pawl 136 forward out of the path of said lifting arm 135; but when the total lever only is set, the said shoulder of the pawl 136 lies directly in the path of the swing of the said arm 135, and on its downward swing, during the forward motion of the handle crank of the machine, the said arm merely swings said pawl 136 out of its way, but on its upward swing, during the return stroke of the handle lever of the machine, said arm makes positive contact with and lifts said pawl 136 and thereby actuates, through the connection link 137, the aforesaid worm shaft 138.

To slow the action of the machine during totaling (generally described at lines 20 et seq. of page 4 of the aforesaid Patent No. 853543), the shifting of the crank arm 140 during totaling shifts the link connection 141 (Fig. 7) that leads back to and is connected with the free end of the horizontally extended crank arm 142 (Figs. 7, 11) secured rigidly to the top of the piston rod 143 of the dash-pot governor. The lower end of said piston rod (Figs. 46-51) is keyed or pinned to the piston head 144, so that the oscillation of the piston rod will effect a corresponding angular shifting of the piston head. The piston head is provided with two ball valves, 145 and 146, the valve 145 acting only during normal adding operations of the machine, and the valve 146 acting only during totaling operations of the machine. The action of these valves is controlled by the cam plate 147 which is held in close contact with the upper face of the outer portion of the piston head, and which is prevented, by the vertical rod 148, from making any angular movement when the piston head is oscillated. The said rod 148 does not prevent the oscillation of the piston head, because the latter movement is accommodated by the elongated slot 149, in said piston head, through which said rod passes. A similar slot 150 accommodates the angular movement of the retaining plate 151 that is secured fast on top of the piston head and serves both to hold the cam plate 147 pressed down upon the piston head, by means of the depending lugs 152, and also serves to distribute peripherally the flow of oil projected upward through the apertures in said cam plate 147 during the down stroke of the piston head. The cam plate 147 has a peripheral aperture 153 so formed that when the piston head is shifted during totaling the ball valve 145 is cut out of action by the closing off of the duct 154 that leads upward from it through the upper face of the piston head. And the said cam plate 147 is also provided with apertures 155 and 156 that register with and open the ball valve 146 when the piston head is shifted during totaling; and is also provided with a depending projection 157 that cams the said ball valve 146 to closed position when the mechanism is not set for totaling. One of these ball valves just compensates the other, so that no change in speed is due to throwing one in and the other out of action when the piston head is oscillated one way or the other; but the cam plate 147 is further provided with two other opertures, a large aperture 158 and a much reduced aperture 159, and during the mere adding operations of the machine, when the piston head is at one limit of its oscillation, the large aperture 158 registers with the large open duct 160 that passes through the piston head, while on the other hand, during totaling operations, when the piston head is shifting to the other limit of its oscillation, the said duct 160 registers with the small aperture, 159, of the cam plate, thus much reducing the possible rate of flow of oil from one side to the other of the piston head during its reciprocation within the cylinder of the dash pot.

To further prevent over-speeding by sudden jerking of the mechanism, a special counterweight device is provided. On the main cam shaft 122 (Figs. 7, 11, 37-40), whose action is generally described at lines 46 et seq. of page 8 of the aforesaid Patent No. 853543 and at lines 35 et seq. of page 2 of the aforesaid Patent No. 938532, there is freely mounted the hub 161 of a heavy flywheel device 162, which bears a crank pin 163 on which is pivotally mounted the rear end of the dog lever 164 whose forward hooked end 165 is adapted to be dropped into the path of the cam tooth 166 on the cam wheel 167 that is pinned to the segment gear shaft 168. Normally the dog lever 164 is held raised (as shown in Fig. 7) by the engagement of its lateral stud pin 169 with the upper edge 170 of the crank arm 140 that is secured on the key-release or total-key shaft 171. But when said crank arm 140 is rocked downward by the rocking of said shaft 171, the said dog lever 164 is pulled downward by the tension of its spring 172, thereby bringing its hooked forward end 165 into the path of said tooth 166 of the cam wheel 167, so that the continued rotation of the segment gear shaft 168 causes said cam to pick up and draw the said lever 164 forward toward the position shown in Fig. 37, whereupon the shoulder 173 of said lever 164 comes into contact with the shoulder 174 of said cam 167, thereby blocking a further rotation of said cam and its shaft 168, the forward upper cam edge 175 of the lever 164 tending to jam under the bushing of the shaft 171. But in normal operation of the machine, without over-speeding or jerking, this jamming action is arrested and the lever 164 instantly returned toward normal, by the pull of its spring 172, as soon as the apex of the cam tooth 166 passes under the apex of the hooked lever-end 165, as indicated in Fig. 37, thus returning the wheel 162 to normal. If, however, the mechanism is over-speeded, the segment-formed weight 176, peripheral to the wheel 162 and swung from the same shaft 122 by the pendent arms 177, moving on a greater radius than the periphery of said wheel 162, and pulled forward by the same crank pin 163, will swing farther forward than the adjacent periphery of wheel 162, such further swing being occasioned by the centrifugal impetus due to the aforesaid greater radius on which the weight 176 is swung, and being accommodated by the slots 178 in said swinging arms 177 and in which the crank pin 163 is engaged. And such further swing or throw of said swinging weight member 176 will tension the spring 179 that is stretched between the peripheral eyelet 180 on the wheel 162 and the lug 181 that projects from the upper part of the rear edge of one of the arms 177; and such tensioning of said spring 179 will momentarily hold the wheel 162 and dog lever 164 at the forward limit of their movement, giving a momentary dwell of the jamming or blocking action just above mentioned, thus checking the too violent jerking or speeding of the segment gear shaft 168 and detaining the main-cam shaft of the machine, through the meshing of the respective gear members on the left ends of said two shafts (see Fig. 3). This momentary dwell of the blocking action is immediately relieved by the swinging weight 176 swinging back to normal gravitatively and under the tension of the aforesaid spring 179; and in so returning, the rear end of said weight 176 will strike the pin 182, which projects radially from the periphery of the wheel 162, and thereby force the said wheel to swing back toward normal and withdraw the dog lever 164 from its jamming or blocking position.

To prevent the column-actuator rock shaft 183, (corresponding with the shaft whose action is described at lines 56 et seq. of page 2 of the aforesaid Patent No. 853543) of the machine from being pushed backward until the forward stroke of the crank handle has been completed, the rock shaft crank 184 is provided with a segment ratchet 185 (Figs. 3, 76) whose fine-spaced teeth are adapted to be engaged by the pawl 186 that is held pressed upon said ratchet by the spring-pressed pawl 187 throughout the forward stroke of the rock shaft. But at the conclusion of the forward stroke said pawl 186 is lifted clear of the ratchet by the lug 188 projecting upward from the forward end of the ratchet, and is held in such raised position throughout the rearward stroke, by reason of the engagement of the free tip of the spring-pressed pawl 187 with the notch in the end of the upwardly projecting arm 189 of said pawl 186. And at the conclusion of the rearward stroke of the said rock shaft segment 185, said pawl 186 is thrown back into active position by contact of its forward lower end with the lug 190 projecting upward and rearward from the forward end of said ratchet (Fig. 3).

The reverse pawl 191 and its segment-formed ratchet 192 (Figs. 3, 29), forming a device to prevent reversal of the main-cam shaft (corresponding with the shaft described at lines 46 et seq. of page 8 of the aforesaid Patent No. 853543) intermediate the limits of either its forward or its backward stroke, are placed on the left side instead of the right side of the machine, the said ratchet 192 being made integrally a part of the same member that drives the main-cam shaft. In this manner the reverse pawl is brought immediately to the work it must perform and torsion of the long main-cam shaft is obviated and the action of the pawl rendered more immediate and positive. To hold the said pawl to its work and prevent it from shifting or dead-centering during the operation of the machine, the forwardly projecting tip of said reverse pawl 191 is provided with a lateral lug 193 which is adapted to be engaged by a guide-piece 194 projecting upward from the middle portion of the connecting rod 195 that swings forward and backward during each forward and backward rocking of the main-cam shaft 122. During the forward movement, said reverse pawl lug 193 is engaged under the lateral curved lip of said guide piece, thus holding the forward end of the reverse pawl in its depressed position; and during the rearward movement, said lug engages the upper face of said lip, thus holding the forward arm of the reverse pawl in its proper raised position.

In canceling (the operation described generally at lines 125 et seq. of page 4 of the aforesaid Patent No. 853543), the top-levers sometimes go to the top of their stroke very suddenly and in rebounding may have a tendency to pull the corresponding numeral wheels around one adding space. To further guard against this the pinion disk 196 is peripherally notched at 197 (Figs. 17, 19) and a pinion disk stop pawl 198 is mounted on the same transverse rod with the carrying lever 199. Each such pawl has at its upper end a detent lug 200 that is normally pressed into engagement with said pinion disk notch 197, preventing movement of said pinion disk 196, but is pressed out of such engagement by the forward swinging of the carrying-lever resetting pins 201 against the forwardly and laterally projecting arm 202 of said pinion disk stop pawl 198.

The paper-lock pawl (corresponding with the device whose action is described at lines 68 et seq. of page 2 of the aforesaid Patent No. 694955) 203 is arranged on the left hand side instead of the right hand side of the machine and adapted to coact with the previously mentioned segment ratchet member 192, the same ratchet with which the reverse pawl 191 coacts. And as in the case of said reverse pawl, this disposition of the paper-lock pawl renders the action of the latter pawl more immediate and positive and obviates the torsional strain and lost motion that might result from having the paper-lock pawl coact with a member located on the other or right hand end of the long main-cam shaft 122, remote from the place at which the driving power, against which such pawl acts, is applied to said shaft.

To obviate any possibility of the carrying pawls 204 (Figs. 17, 20, 21) jumping out of their proper engagement with the ratchet they drive (corresponding with the ratchet teeth described at lines 26 et seq. of page 3 of the aforesaid Patent No. 661121), a transverse rod 205 is located just over the forward part of the driving end of said pawls and the adjacent upper edge of said pawls is shaped to cam thereunder.

To check over-momentum and further prevent over-rotation of the numeral wheels (corresponding with the numeral wheels described at lines 24 et seq. of page 3 of the aforesaid Patent No. 661121), there is provided an escapement pawl 206 (Figs. 17, 20-26), pivotally mounted on the transverse rod 207 and having its back-and-forth oscillation limited by the transverse rod 208 passing through the elongated slot 209 in the body of said pawl. The front and rear upwardly projecting arms 210 and 211, of said pawl partly encompass the ratchet member 212 that is fast with the numeral wheel, and alternately engage teeth on opposite sides of said ratchet, intercepting the ratchet at each one-space movement but allowing one tooth after another to escape, as indicated in Fig. 20, effectually checking any over-rotation of the wheel.

In totaling operations (corresponding with those described at lines 20 et seq. of page 4 of the aforesaid Patent No. 853543), a pin 213 on the pinion disk, moving clockwise as seen in Fig. 23, engages the shoulder 214 of the answer-pawl 215, thereby determining the positioning of the top-levers and their corresponding type-heads, for the recording of the answer or total. This answer-pawl is delicately pivoted and under the tension of the delicate spring 216, and there is sometimes a possibility of grit or oil causing it to stick in the inoperative position into which it is pressed by the counter-clockwise movement, over its ends, of the aforesaid pin 213, during the ordinary adding operations of the machine. To obviate the possibility of the answer pawl so sticking in inoperative position, the outer end of said pawl on the side of its pivot nearer its spring 216 is shaped outward into a cam edge 217 which makes contact with and is pressed inward by the pin 213 each time said pin passes over it in said counter-clockwise direction during the ordinary adding operations of the machine, so that the said pawl is repeatedly freed and swung both ways on its pivot during every operation of adding a column of numbers and all possibility of its becoming jammed or stuck in non-operative position, with its free end depressed instead of held out from the axis of the numeral wheel, is practically obviated.

When the hammer-returning bail 218 (Figs. 8, 12, 66), whose action is described at lines 104-106 of page 7 of the aforesaid Patent No. 853543, is swung against the tension of its springs 219 (Fig. 12), frictional resistance is minimized and practically obviated by the sheet metal clips 220 and 221 through which said springs are connected with said bail, the mutually contiguous edges of said clips being rebent into lips 222 and 223 (Figs. 67, 68) that interengage and hinge upon each other in such a manner as to practically eliminate frictional resistance of the swinging movement of one clip on the other that must occur as the oscillating bail moves against the tension of the strong springs 219 whose other ends are attached at a fixed position on the inner wall of the top casing of the machine. Fig. 69 (on Sheet 28 of the drawings) particularly indicates the peculiarly frictionless manner in which these clips interengage and hinge upon each other, the extreme free edge of the rebent lip 223 (of clip 221) merely rocking upon the slightly concave lower face of the rebent lip 222 (of the clip 220), so that as the bail 218 swings back and forth, under the stretching and retraction of the strong springs 219, there is practically no frictional rubbing along the place of engagement between the clips that are attached to the said springs and the clips that are attached to the bail member.

To give more time for the operation of a long succession of carryings across the width of the machine (such, for instance, as the series of carryings described at lines 45-49 of page 6 of the aforesaid Patent. No. 853543), the carrying pawls are tripped at the initial part instead of the latter part of the return stroke of the handle crank of the machine. To effect this the main-carrying-pawl 224 (Fig. 2), which effects the tripping of all the carrying mechanism, is provided near its lower rear end with a spring pressed flipper-pawl 225, adapted to be engaged by a pin 226 on the main-cam, 134, of the machine. This flipper-pawl is merely pressed out of the way by said pin as the part of said main-cam bearing said pin moves over it during the forward stroke of the handle lever of the machine, but just at the initial part of the return stroke said pin positively engages said flipper-pawl and thereby shifts the aforesaid main carrying pawl 224, immediately tripping off all of the carrying mechanisms across the series of numeral wheels of the machine.

Other features of the mechanism will be apparent from inspection of the drawings; and, as before stated, the general construction and operation of the machine will be understood from the specifications of the prior comptograph patents hereinabove cited.

My invention is hereinabove set forth as embodied in one particular form of construction, but it may be embodied in other forms within the statement of claim hereinafter made.

I claim:

1. In a printing adding-machine, in combination: multiple-order adding-mechanism; printing mechanism, including a plurality of side-by-side type-members for the series of denominational orders; column-actuators for said orders, arranged in the same right-and-left succession; and swinging connections between said type-members and column-actuators, said connections extending transversely across the machine and being telescopically nested with each other; substantially as specified.

2. In a printing adding-machine, in combination: multiple-order adding-mechanism; printing-mechanism, including the plurality of side-by-side type-heads; the column-actuator levers for the corresponding denominational orders, arranged in the same right-and-left succession; and the swinging type-head-connections telescopically nested with each other; substantially as specified.

3. In a printing adding-machine, in combination: multiple-order adding-mechanism; printing mechanism, including a plurality of side-by-side type-members for the series of denominational orders; column-actuators for said orders, arranged in the same right-and-left succession; and swinging connections between said type-members and column-actuators, said connections extending transversely across the machine and being telescopically nested with each other and disposed in a right and a left group with respect to the type-heads; substantially as specified.

4. In a printing adding-machine, in combination: multiple-order adding-mechanism; printing-mechanism, including a plurality of side-by-side type-members for the series of denominational orders; column-actuators for said orders, arranged in the same right-and-left succession; and swinging connections between said type-members and column-actuators, said connections extending transversely across the machine and being telescopically nested with each other and disposed in a right and a left group with respect to the type-heads and in an upper and a lower series; substantially as specified.

5. In a printing adding-machine, in combination: multiple-order adding-mechanism; printing-mechanism, including the plurality of side-by-side type-heads; the column-actuator levers for the corresponding denominational orders, arranged in the same right-and-left succession; and the swinging type-head-connections telescopically nested with each other and disposed in a right and a left group with respect to the type-heads; substantially as specified.

6. In a printing adding-machine, in combination: multiple-order adding-mechanism; printing-mechanism, including the plurality of side-by-side type-heads; the column-actuator levers for the corresponding denominational orders, arranged in the same right-and-left succession; and the swinging type-head-connections telescopically nested with each other and disposed in a right and a left group with respect to the type-heads and in an upper and a lower series; substantially as specified.

7. In a printing adding-machine, in combination: multiple-order adding-mechanism; printing-mechanism including side-by-side type-hammers for the series of denominational orders, and corresponding side-by-side hammer-release devices; column-actuators for the respective orders, arranged in the same right-and-left succession; and transmission connections between said column-actuators and hammer-release devices, said connections being telescopically nested with each other; substantially as specified.

8. In a printing adding-machine, in combination: multiple-order adding-mechanism; printing mechanism, including side-by-side type-hammers for the series of denominational orders, and the corresponding hammer-release levers; the column-actuator levers for the respective orders, arranged in the same right-and-left succession; and the transverse connections, telescopically nested with each other, transmitting movement to said hammer-release levers; substantially as specified.

9. In a printing adding-machine, in combination: multiple-order adding mechanism; printing mechanism, and its actuating devices, for printing the items added; totaling devices for causing said printing mechanism to print the total of the items added; a governor mechanism for controlling the speed of action of the machine during adding operations, and provided with an automatically operated adjustment to give a reduced speed during totaling operations; substantially as specified.

10. In a printing adding-machine, in combination: multiple-order adding mechanism; printing mechanism, and its actuating devices, for printing the items added; totaling devices; canceling devices; and the three-speed governor device for providing a reduced speed of action of the machine during totaling and canceling operations; substantially as specified.

11. In a key-set adding machine, in combination: multiple-order adding mechanism; actuating devices therefor; key-set devices adapted to engage said actuating devices at various points and so determine the extent of the actuating movement in the different denominational orders; and jaw devices for retaining said key-set devices in proper engagement with said actuating devices during actuating movements; substantially as specified.

12. In an adding-machine, in combination: the key-set actuating-lever connections; the cam-toothed adding-arms; the cam-toothed answer-arms; and the alligator-jaws for retaining said key-set connections in proper engagement with said adding-arms and answer-arms; substantially as specified.

13. In an adding-machine, in combination: multiple-order numeral-wheel mechanism, including the spring-actuated carrying pawls for the series of denominational orders, and the ratchets engaged by said pawls; and the retaining device for holding said pawls into proper engagement with their ratchets during carrying movements; substantially as specified.

14. In a printing adding machine, in combination: the multiple-order adding mechanism; the printing mechanism; the actuating mechanism; operating connections between said adding-and-printing mechanisms and said actuating mechanism, and between the latter and the totaling mechanism; and the totaling mechanism, whereby the printing-mechanism, independently of the normal actuation of its actuating-mechanism, is caused to print the total registered by the adding-mechanism, said totaling-mechanism including the answer-pawls for determining the extent of movement of the actuating mechanism during totaling, said answer pawls being provided with cam projections whereby they are adapted to be positively shifted into normal operative position if displaced therefrom during the ordinary adding operations of the machine; substantially as specified.

15. In a multiple-order printing adding machine, in combination: adding mechanism; printing mechanism; totaling mechanism; canceling mechanism; main actuating mechanism having a rocking drive movement; and connection devices whereby said printing mechanism is timed to be actuated during the initial stroke and said canceling mechanism during the return stroke of said rocking drive movement, at each totaling and canceling operation of the machine; substantially as specified.

16. In a multiple-order printing adding machine, in combination: the adding mechanism, including a series of carrying mechanism for the series of denominational orders; totaling mechanism; main actuating mechanism having a rocking drive movement; operating connections between the adding-and-printing mechanisms and the actuating mechanism, and between these mechanisms and the totaling and canceling mechanisms; and connection devices whereby the carrying mechanisms are timed to be tripped at the initial part of the return stroke of said rocking drive movement; substantially as specified.

17. In a printing adding machine, in combination: a main driving rock-shaft; adding mechanism; a main driven rock-shaft for transmitting driving actuations to said mechanism; and a segment-ratchet member, coacting with a two-way reversible pawl, for preventing reversal of the movement of said driven rock-shaft intermediate the limits of both its initial and return strokes, said segment-ratchet being secured to the driven end of said driven rock-shaft, to obviate torsion and lost motion; substantially as specified.

18. In a printing adding machine, in combination: adding mechanism; a main driven rock-shaft for transmitting driving actuations to said mechanism; and a segment-ratchet member, coacting with a two-way reversible pawl, for preventing reversal of the movement of said rock shaft intermediate the limits of both its initial and return strokes, said reverse-pawl being provided with a shiftable guide for retaining it in one of its operative positions during the initial stroke of said rock-shaft and in its other operative position during the return stroke; substantially as specified.

19. In a printing adding machine, in combination: multiple-order adding mechanism; printing mechanism, including a plurality of printing hammers for the series of denominational orders, and the spring-pulled swinging bail for resetting the gang of hammers, said bail being connected with its springs by the sheet-metal clips having rebent lips interengaged to permit free hinging movement of one clip in respect to the other; and actuating devices for said mechanism; substantially as specified.

20. In a multiple-order printing adding machine, in combination: adding mechanism; including paper holding and feeding devices; a driven rock-shaft for transmitting driving actuations to said mechanism; a paper-lock device for tripping a locking pawl into operative position when the end of the paper being fed through the printing mechanism is reached; and a ratchet member to be engaged by said locking pawl, said ratchet member being secured to the driven end of said rock-shaft, to obviate torsion and lost motion; substantially as specified.

In testimony whereof I have hereunto set my hand in the presence of two subscribing witnesses.

FREDERICK A. NIEMANN.

Witnesses:
HENRY LOVE CLARKE,
H. M. MUNDAY.